US008611505B2

(12) United States Patent
Oppenheim et al.

(10) Patent No.: US 8,611,505 B2
(45) Date of Patent: *Dec. 17, 2013

(54) METHOD AND SYSTEM OF GENERATING REFERENCE VARIATIONS FOR DIRECTORY ASSISTANCE DATA

(75) Inventors: Kyle Oppenheim, Mountain View, CA (US); David Mitby, Mountain View, CA (US); Nick Kibre, Redwood City, CA (US)

(73) Assignee: Microsoft Corporation, Redmond, WA (US)

( * ) Notice: Subject to any disclaimer, the term of this patent is extended or adjusted under 35 U.S.C. 154(b) by 1080 days.

This patent is subject to a terminal disclaimer.

(21) Appl. No.: 12/611,064

(22) Filed: Nov. 2, 2009

(65) Prior Publication Data

US 2010/0049502 A1 Feb. 25, 2010

Related U.S. Application Data

(63) Continuation of application No. 11/002,829, filed on Dec. 1, 2004, now Pat. No. 7,623,648, which is a continuation-in-part of application No. 09/621,715, filed on Jul. 24, 2000, now Pat. No. 7,447,299.

(51) Int. Cl.
*H04M 1/64* (2006.01)
(52) U.S. Cl.
USPC .................................. 379/88.01; 379/218.01
(58) Field of Classification Search
USPC .............. 379/88.01, 88.02, 218.01; 704/8, 9, 704/270, 270.1, 275
See application file for complete search history.

(56) References Cited

U.S. PATENT DOCUMENTS

| 4,608,460 | A | 8/1986 | Carter et al. |
| 4,979,206 | A | 12/1990 | Padden et al. |
| 5,031,206 | A | 7/1991 | Riskin |
| 5,131,045 | A | 7/1992 | Roth |
| 5,255,310 | A | 10/1993 | Kim et al. |
| 5,479,489 | A | 12/1995 | O'Brien |
| 5,638,425 | A | 6/1997 | Meador, III et al. |
| 5,890,123 | A | 3/1999 | Brown et al. |
| 5,917,889 | A | 6/1999 | Brotman et al. |
| 5,952,942 | A | 9/1999 | Balakrishnan et al. |
| 5,987,414 | A | 11/1999 | Sabourin et al. |
| 6,052,443 | A | 4/2000 | Perera et al. |
| 6,236,967 | B1 | 5/2001 | Brotman et al. |
| 6,421,672 | B1 | 7/2002 | McAllister et al. |
| 6,728,348 | B2 | 4/2004 | Denenberg et al. |
| 6,925,154 | B2 | 8/2005 | Gao et al. |
| 7,415,409 | B2 | 8/2008 | Simoneau et al. |
| 7,447,299 | B1 | 11/2008 | Partovi et al. |

(Continued)

OTHER PUBLICATIONS

U.S. Appl. No. 11/002,829, filed Dec. 1, 2004, Oppenheim et al.

(Continued)

*Primary Examiner* — Olisa Anwah
(74) *Attorney, Agent, or Firm* — Perkins Coie LLP

(57) ABSTRACT

Methods and systems of performing user input recognition are disclosed. A digital directory comprising listings is accessed. Metadata information is associated with individual listings describing the individual listings. The metadata information is modified to generate transformed metadata information. Therefore, the transformed metadata information is generated as a function of context information relating to a typical user interaction with the listings. Information is generated for aiding in an automated user input recognition process based on the transformed metadata information.

28 Claims, 37 Drawing Sheets

(56) References Cited

U.S. PATENT DOCUMENTS

| | | |
|---|---|---|
| 2004/0249632 A1 | 12/2004 | Chacon |
| 2005/0043940 A1 | 2/2005 | Elder |
| 2005/0075881 A1 | 4/2005 | Rigazio et al. |
| 2005/0096908 A1* | 5/2005 | Bacchiani et al. ............ 704/257 |
| 2005/0105712 A1 | 5/2005 | Williams et al. |
| 2005/0114131 A1 | 5/2005 | Stoimenov et al. |
| 2006/0130117 A1 | 6/2006 | Lee et al. |
| 2006/0143007 A1 | 6/2006 | Koh et al. |
| 2006/0259478 A1 | 11/2006 | Martin et al. |
| 2008/0201143 A1 | 8/2008 | Olligschlaeger et al. |
| 2009/0030687 A1 | 1/2009 | Cerra et al. |

OTHER PUBLICATIONS

Brill, E., "Transformation-Based Error-Driven Learning and Natural Language Processing: A Case Study in Part of Speech Tagging," The Johns Hopkins University; Department of Computer Science, 1995 (37 pgs.).

Brill, E., "Unsurpervised Learning of Disambiguation Rules for Part of Speech Tagging," Johns Hopkins University; Department of Computer Science; 1995 (13 pgs.).

Christen, P. et al., "Febrl—Freely Extensible Biomedical Record Linkage," Release 0.1; Australian National University; Department of Computer Science; Sep. 5, 2002 (74 pgs.).

* cited by examiner

1200

1210 →

Gen*mart Store No 34 —1225a
123 Main St.
  Store
  Vision Center —1225e
  Tire Sales
234 Oak Avenue
  Store
  Pharmacy
Genmart Pharmacy — 1225i 123 Main St.

1230

Known Entity: Genmart
Address: 123| Main | St
Main: Store
Dept: Optometry
???
Address: 234| Oak | Ave
Main: Store
Dept: Pharmacy
Known Entity: Genmart;
Dept: Pharmacy

Known Entity: Walmart
Address: 123| Main | St
 Main: Store
 Dept: Optometry
 Dept: Tire Sales
Address: 234| Oak | Ave
 Main: Store
 Dept: Pharmacy
Known Entity: Genmart;
 Dept: Pharmacy 123 Main St.

FIGURE 11C

1210
Gen*mart Store No 34
 123 Main St.
  Store
  Vision Center
  Tire Sales — 1225e
 234 Oak Avenue
  Store
  Pharmacy
Genmart Pharmacy

1200

1210 →

Gen*mart Store No 34 — 1225a
123 Main St. — 1225b
 Store — 1225c
 Vision Center — 1225d
 Tire Sales — 1225e
234 Oak Avenue — 1225f
 Store — 1225g
 Pharmacy — 1225h
Genmart Pharmacy — 1225i

1230 →

KE : Genmart
Addr: 123| Main | St          KE + Main
Main: Store                    KE + Main
Dept: Optometry                KE + Dept
Dept: Tire Sales               KE + Dept
Addr: 234| Oak | Ave
Main: Store                    KE + Main
Dept: Pharmacy                 KE + Dept
KE: Genmart; Dept: Pharmacy    KE + Dept

METHOD AND SYSTEM OF GENERATING REFERENCE VARIATIONS FOR DIRECTORY ASSISTANCE DATA

CROSS-REFERENCE TO RELATED APPLICATIONS

This application is a continuation of U.S. patent application Ser. No. 11/002,829, filed Dec. 1, 2004, now U.S. Pat. No. 7,623,648 issued Nov. 24, 2009, titled "METHOD AND SYSTEM OF GENERATING REFERENCE VARIATIONS FOR DIRECTORY ASSISTANCE DATA," which is a continuation-in-part of U.S. patent application Ser. No. 9/621,715, filed Jul. 24, 2000 now U.S. Pat. No. 7,447,299 issued Nov. 4, 2008, titled "VOICE AND TELEPHONE KEYPAD BASED DATA ENTRY FOR INTERACTING WITH VOICE INFORMATION SERVICES", both of which applications are incorporated by reference herein in their entireties.

TECHNICAL FIELD

Embodiments of the present invention relate to the field of information systems and software systems. Specifically, embodiments of the present invention relate to a method and system for generating reference variations from directory assistance data by performing semantic analysis on the directory assistance data.

BACKGROUND

Advances in information storage capacity and CPU processing power have provided for enhanced performance of speech recognition systems. The utilization of these systems to provide automated information services such as automated directory assistance ("DA") allow significant cost savings by increasing the number of calls that can be handled while simultaneously reducing the need for human operators. Automated speech information services may be provided over existing networks such as the PSTN (Public Switched Telephone Network).

Typically these services are provided at a network node that combines an IVR (Interactive Voice Response) system on the front end with a speech recognition engine at the back end. Directory assistance data typically includes entities and a set of associated information such as phone numbers, addresses, etc. for these entities. A user provides an input reference, for example, in the form of a spoken utterance or a text string to refer to a particular entity for which associated information is sought to a directory assistance service. The directory assistance service returns the requested associated information based upon a determination of the referred entity, which is determined as a function of the input reference.

A critical step in the performance of these automated information services is the configuration of the underlying speech recognition engine to insure the highest recognition rates and most robust performance. Typically speech recognition engines utilize a context free grammar ("CFG") or an SLM ("Statistical Language Modeling") approach for performing recognition.

A significant technical challenge in the implementation of these systems is generating an appropriate grammar from a raw information source. Thus, there exists a need for a method and system for generation of robust grammars.

SUMMARY

Embodiments of the present invention provide methods and systems of performing user input recognition. In accordance with one embodiment, a digital directory comprising listings is accessed. Then this embodiment associates metadata information with individual listings describing the individual listings. The metadata information is modified to generate transformed metadata information. Therefore, the transformed metadata information is generated as a function of context information relating to a typical user interaction with the listings. Information is generated for aiding in an automated user input recognition process based on the transformed metadata information.

Embodiments of the present invention provide these advantages and others not specifically mentioned above but described in the sections to follow.

BRIEF DESCRIPTION OF THE DRAWINGS

The accompanying drawings, which are incorporated in and form a part of this specification, illustrate embodiments of the invention and, together with the description, serve to explain the principles of the invention:

FIGS. 11A-11F are diagrams of metadata illustrating automatically generating speech recognition grammars from telephone directory data, in accordance with an embodiment of the present invention.

DETAILED DESCRIPTION

Figure 1A:
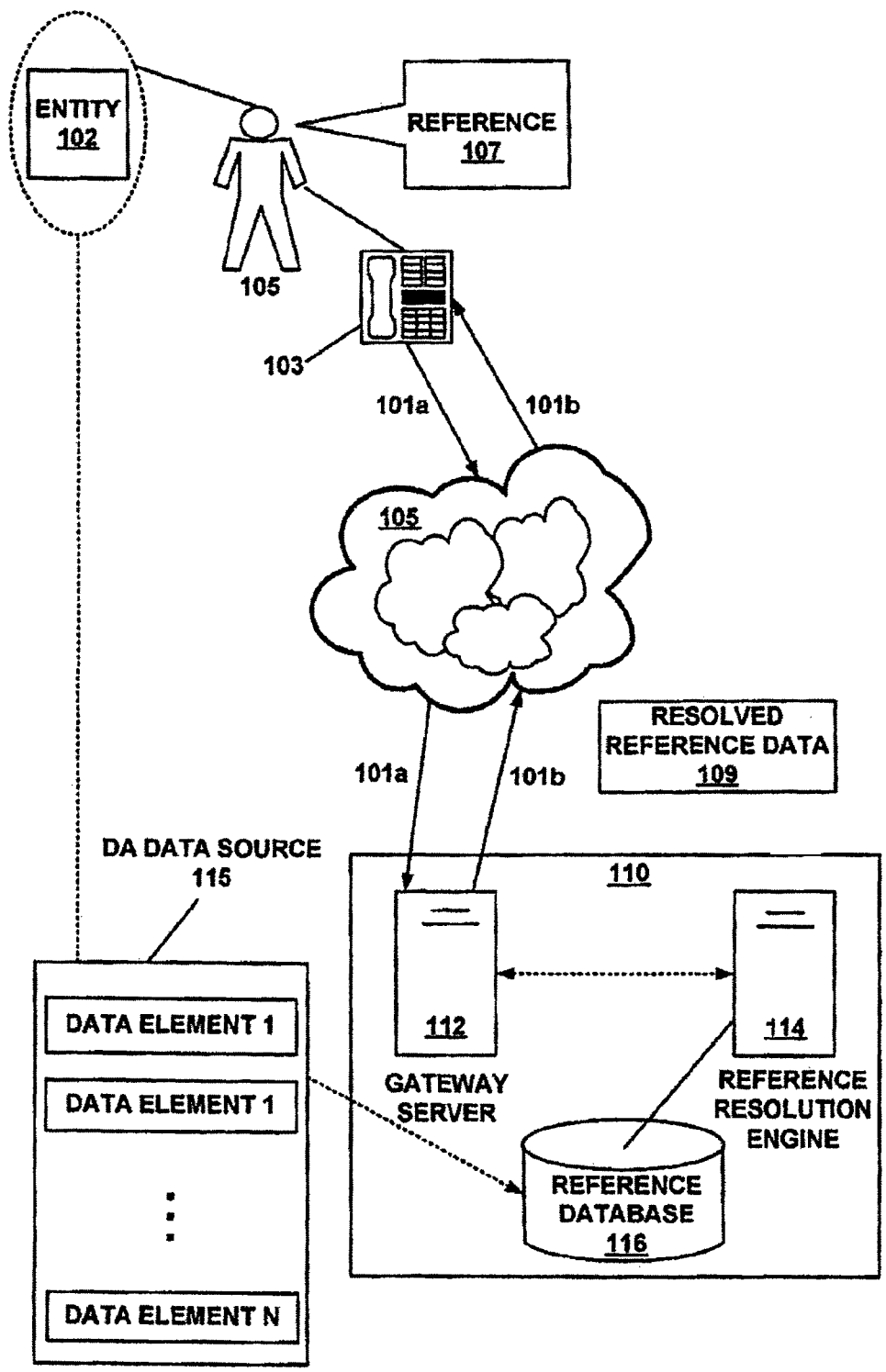
FIG. 1A illustrates an environment for application of embodiments of the present invention.

In the following detailed description of embodiments of the present invention, a method and system of generating reference variations for directory information data, numerous specific details are set forth in order to provide a thorough understanding of the present invention. However, it will be recognized by one skilled in the art that the present invention may be practiced without these specific details or with equivalents thereof. In other instances, well-known methods, procedures, and components have not been described in detail as not to unnecessarily obscure aspects of the present invention.

Notation and Nomenclature

Some portions of the detailed descriptions that follow are presented in terms of procedures, steps, logic blocks, processing, and other symbolic representations of operations on data bits that can be performed on computer memory. These descriptions and representations are the means used by those skilled in the data processing arts to most effectively convey the substance of their work to others skilled in the art. A procedure, computer executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "receiving," "generating," "processing," "integrating," "computing," "determining," "performing," "storing," "outputting," "accessing," "associating," "selecting," "modifying," or the like refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the present invention provide a method and system for generating reference variations for directory information data such as that typically provided via a directory assistance service. The generated reference variations may then be utilized in conjunction with a search entity, which upon receipt of an input reference expression, determines the referenced entity and returns the requested associated information. For example, according to one embodiment, the present invention is applied in the context of a speech recognition system that may be located at a network node for purposes of providing automated directory assistance information. However, embodiments of the present invention may be applied in any number of other contexts, for example, involving a simple string lookup via a data network such as the Internet.

Typically, a raw information source (e.g., digital telephone directory) comprises individual information items that a user might desire to access. For example, in a directory assistance scenario, the information items would include individual listings. Typically directory assistance data does not account for the myriad of variations that users might employ to refer to particular entities. This is so because of the immense variations and permutations existing in human expression. Moreover, typically human users refer to particular information items in a format that is incompatible in a speech recognition scenario with the raw information format. This occurs, in particular, because human users refer to information items using a mixture of contextual information as well as the proper name for the information item. Utilizing the DA scenario once again, a listing for a department store in a raw information source might appear as:

"GenMart Store No. 34"
   "123 Oak Street"
      "Main Number    415-555-1234    Palo Alto, CA"

However, a user might refer to this store using a typical colloquial expression such as "Genmart Department Store in Palo Alto," "Genmart on Oak," "Genmart Department Store," etc. Thus, users typically refer to information items using an intermingling of proper names and contextual information such as types of things, locations, etc.

However, significant cost and efficiency benefits are to be gained by automating the DA process. Thus, there is a significant need for machine understanding via semantic analysis of directory assistance data in order to capture reference variations for particular entities.

Embodiments of the present invention automatically semantically analyze directory assistance data in order to capture reference variations for particular entities. Embodiments of the present invention automatically generate reference variations for directory assistance data. One embodiment of the present invention automatically generates input parameters suitable for speech recognition processes. Another embodiment is an automated telephone directory assistance program that features speech recognition. In an automated telephone directory assistance program embodiment, synonyms of what a caller might say when calling telephone directory assistance are automatically generated from a contextual analysis of the telephone directory data. For example, the telephone directory data might use a listing of "pharmacy" for a department store's pharmacy. However, a caller might request the telephone number for "prescriptions." Thus, the synonym "prescription" may be automatically generated from the telephone directory data. The synonyms are used in the speech recognition grammar for improved speech recognition. Further, one or more presentation names may be output to the caller, responsive to a request for directory information. This allows the caller to confirm that the correct telephone number is being supplied. It will be appreciated that the present invention is not limited to speech recognition processes.

FIG. 1A illustrates an environment for application of embodiments of the present invention. User 105 desires directory assistance information for entity 102, which is represented in some format with the stores of DA data source 115. DA source data 115 may be compiled from any number of sources utilizing any number of methods. Typical DA data source 115 stores information relating to entities of interest in a fashion not amenable to retrieval utilizing typical human variations in references to the entity.

In order to access desired information, user 105 utilizes network access device 103 such as a telephone, computer keyboard, etc., to connect to DA node 110 via network 105. In particular, user 105 provides reference 107 via network access device 103 and network 105, which is received by gateway server 112 at network node 110 (via communication link 101*a*). Reference 107 may be, for example, a spoken utterance, a text reference or any other form of human communication. Gateway server 112 provides the received reference 107 to reference resolution engine 114, which attempts to resolve the reference utilizing reference database 116. The resolved reference data 109 is then returned to user 105 (via communication link 101*b*).

A significant technical issue concerns the combined operation of reference resolution engine 114 in conjunction with reference database 116. In particular, it is desirable that reference resolution engine 114 be capable of recognizing as many variations in human references to entities 102 as possible. Thus, it is desirable to process DA source data 115 into a machine readable format that encodes as many reference variations to entities as possible in such a way that the desired entity is recognized by reference resolution engine 114.

Figure 1B:
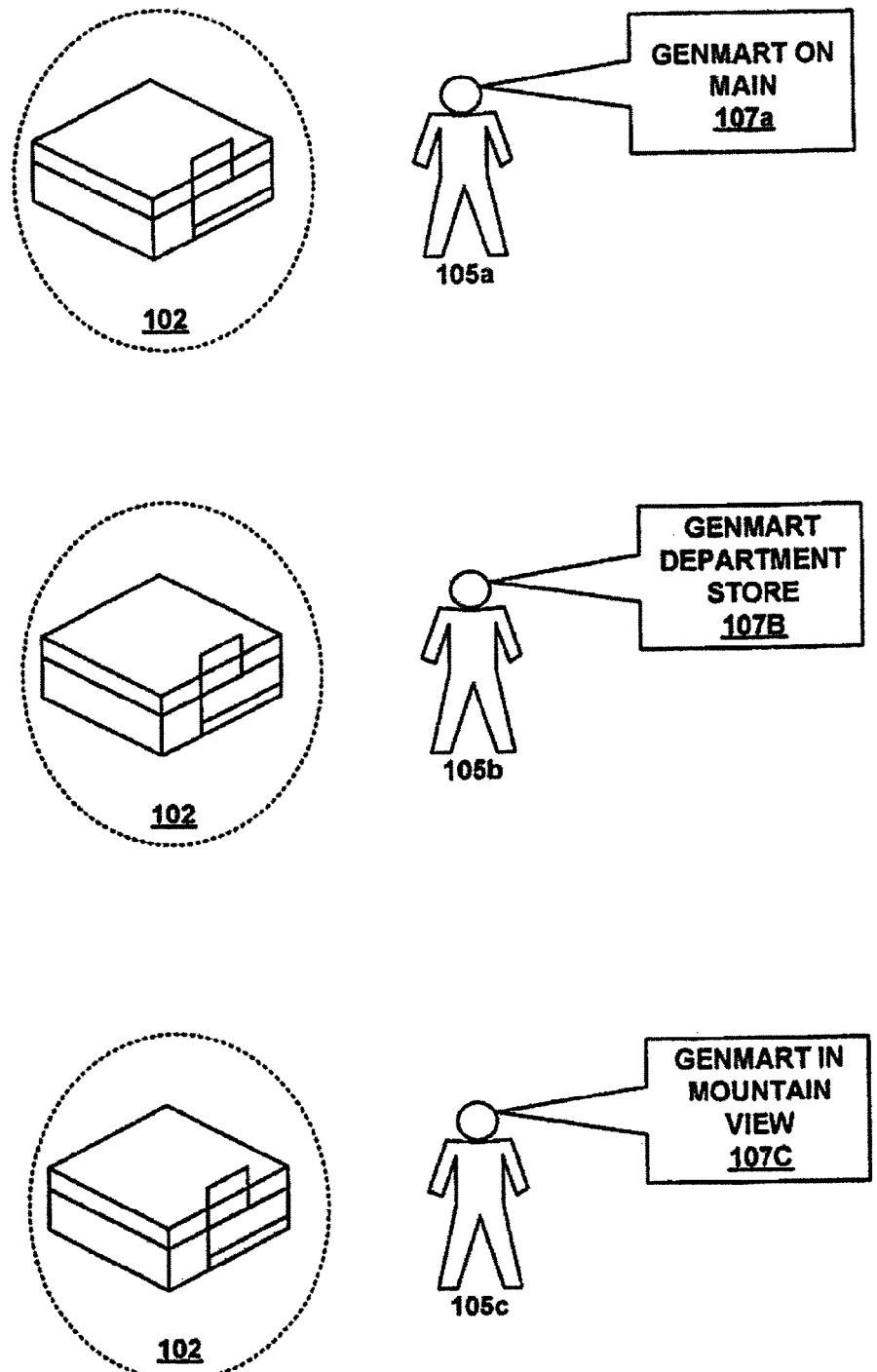
FIG. 1B illustrates reference variations for a particular entity.

FIG. 1B further illustrates reference variations for a particular entity 102. Note that although users 105*a*-105*c* all have in mind the same reference, for example, to a particular department store, each user refers to the store differently. That is, user 105*a* refers to the department store entity 102 as "Genmart on Main." User 105*b* refers to this same entity as "Genmart Department Store." User 105*c* utilizes yet another variation in reference, referring to the store as "Genmart Mountain View." Note that these variations are highly subjective and may vary not only between different users but also within a single user.

Figure 1C:
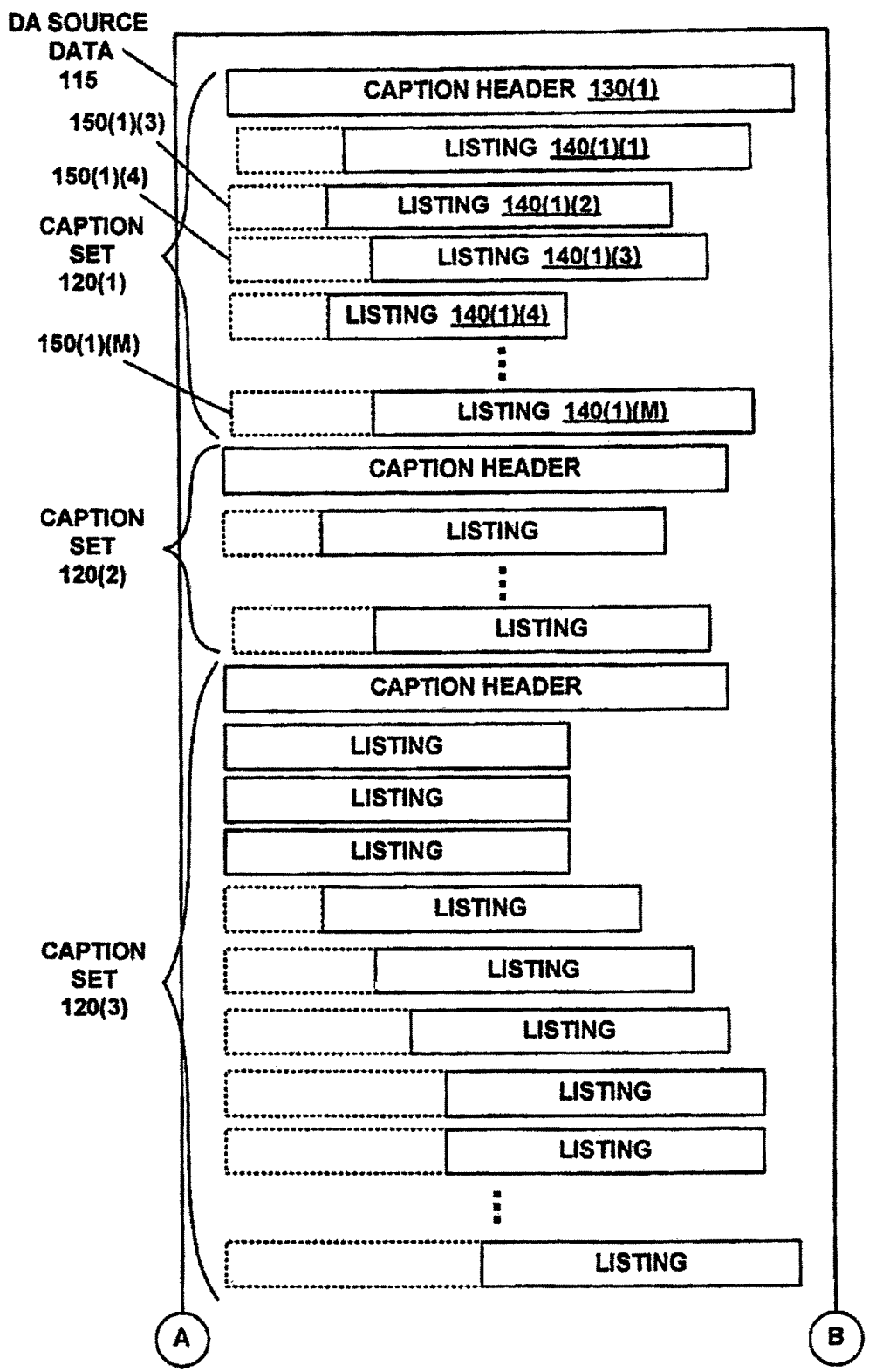
FIG. 1C illustrates a typical directory assistance data source, which may be an input to embodiments of the present invention.
Figure 1C:
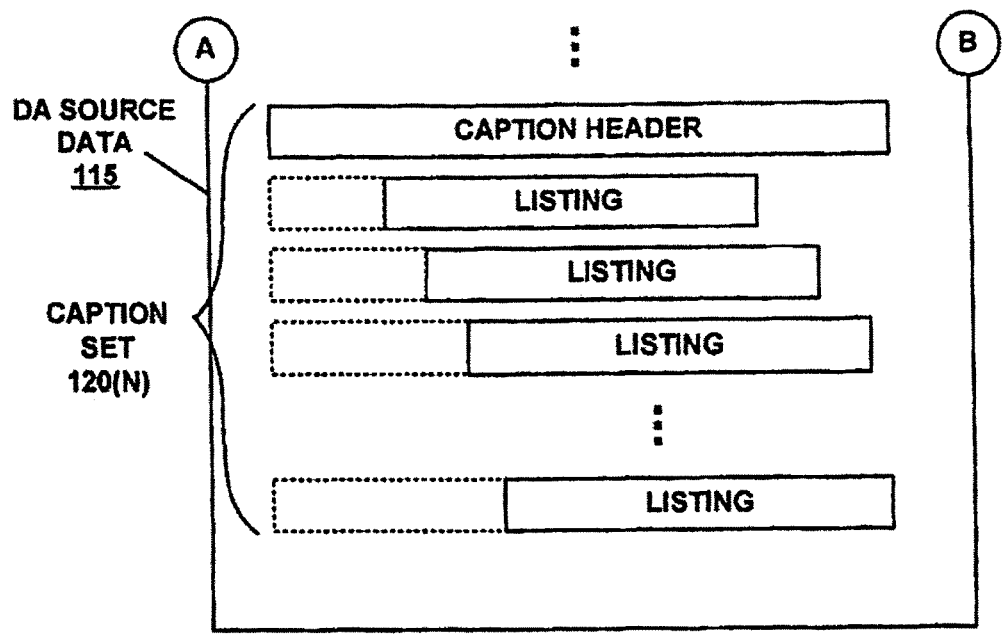

FIG. 1C illustrates a typical directory assistance data source. Data source 115 includes a plurality of text strings, which are arranged according to a predefined format. According to one embodiment of the present invention, the formatting information, which can be analyzed via machine analysis of DA data source 115, implies a particular structural relationship between data in DA source data file 115. For example, according to the example shown in FIG. 1C, directory source data 115 includes listings 140(1)(1)-140(N)(M), which are formatted into caption sets 120(1)-120(N) respectively demarcated by caption headers 130(1)-130(N). Each listing is associated with a particular indentation level 150(1)(1)-150(N)(M). Although, for example, no indentation level is indicated in FIG. 1C for listings 140(1)(1), it is inferred that the indentation level for similar listings is zero. According to one embodiment of the present information, indentation levels for listings are utilized to infer hierarchical relationships between listings within a particular caption set. In one embodiment, a caption set may be comprised of only a caption header. A caption set in this form may be referred to as a "straight line listing."

Note that the particular formatting of DA source data 115 shown in FIG. 1C is merely exemplary and not intended to limit the scope of the application or the claims appended hereto. The present invention is compatible with directory source data formatted in any arbitrary manner and thereby from which structural information can be gleaned.

Figure 2:
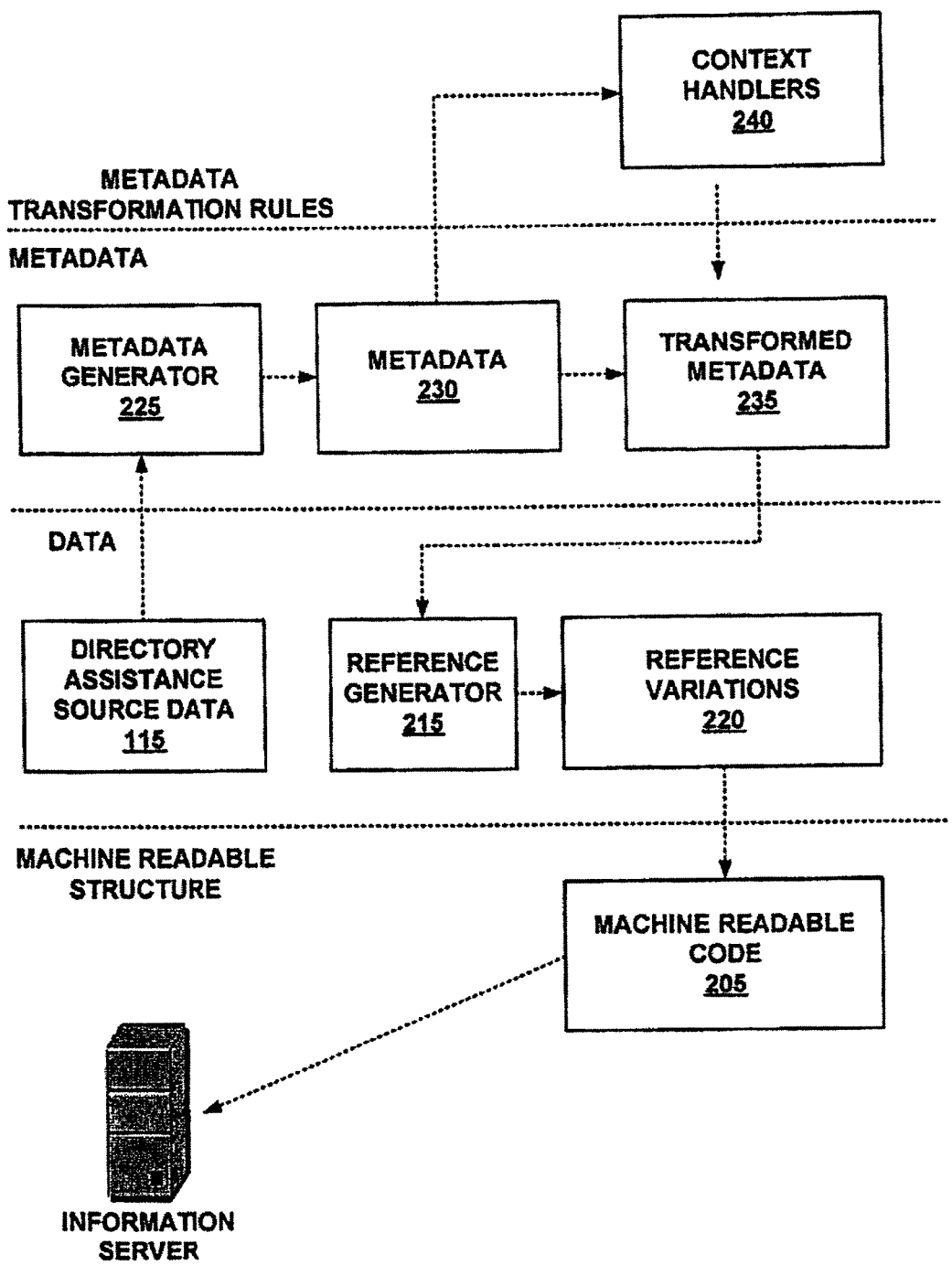
FIG. 2 is a block diagram illustrating generation of reference variations for directory assistance data according to one embodiment of the present invention.

FIG. 2 is a block diagram illustrating operation of an embodiment of the present invention. Metadata generator 225 processes directory assistance source data 115 to generate metadata 230. Metadata 230 describes the data in directory assistance source data 115. Equivalently, metadata 230 is itself any data concerning the underlying data in DA source data 115. For example, metadata can include representations of the content, context, structure, quality, provenance, condition and other characteristics of an information bearing object included in DA source data 115. Examples of metadata 230 as it relates to the present invention will become evident as the invention is further described.

Based upon the generated metadata, context handlers 240 perform transformations to process metadata 230 and produce transformed metadata. According to one embodiment of the present invention, transformations are effected utilizing a plurality of heuristic rules applied to metadata 230. Reference generator 215 processes transformed metadata 235 to generate synonym phrases that reflect variations in human references to particular entities in DA source data 115.

It is important to note the relationship between metadata, transformed metadata 235 and the operation of reference generator 215. First, metadata describing DA data source aids in generation of reference variations because human users typically refer to entities using a mixture of proper names as well as descriptive information as illustrated above. Second, the metadata transformations allow the refinement of metadata 230 to contextualize the meaning of the DA data source and thereby further enhance the possibility for robust generation of reference variations by synonym phrase generator 215.

The structure and function of metadata generator, context handlers and synonym generators are described in detail below with respect to embodiments depicted in FIGS. 5A-9.

Figure 3A:
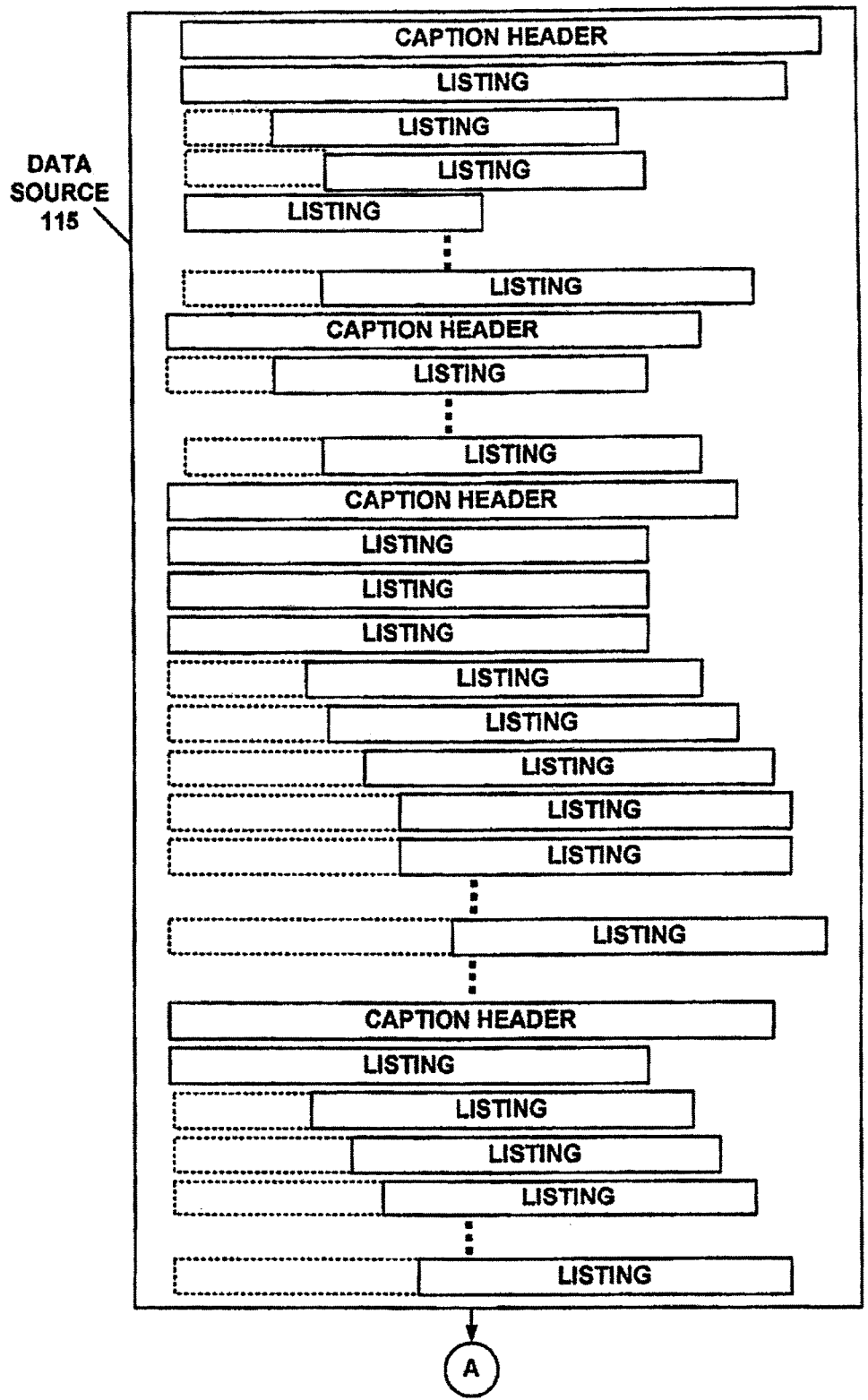
FIG. 3A is a flowchart illustrating steps of a process of automatically generating reference variations for directory assistance data, in accordance with an embodiment of the present invention.
Figure 3A:
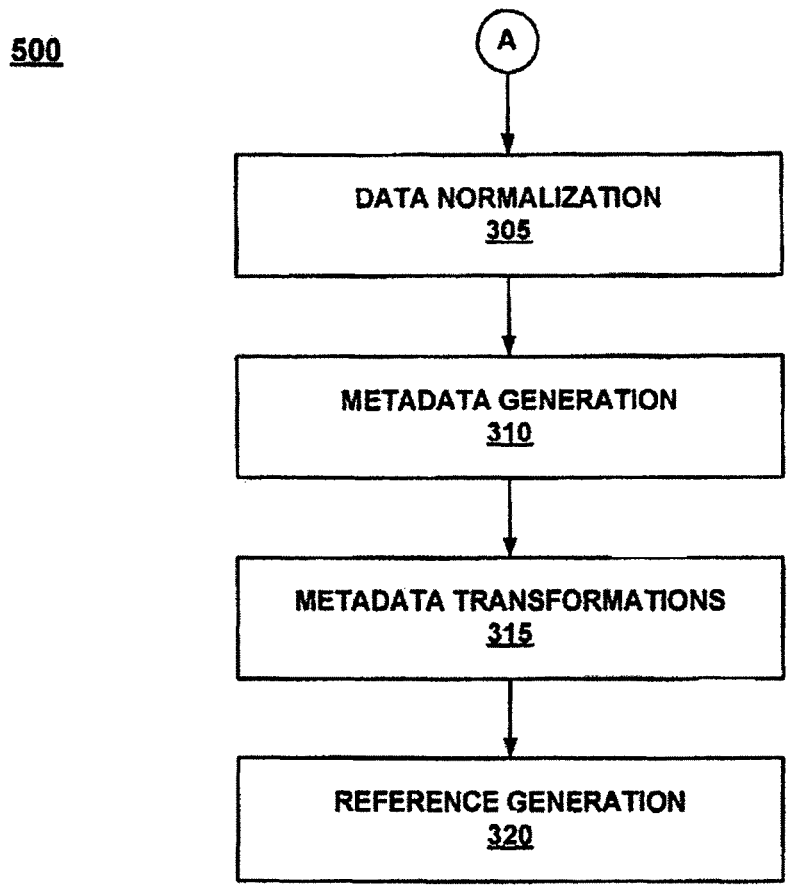

FIG. 3A is a flowchart illustrating steps of a process of automatically generating reference variations (e.g., synonym phrases) for a data source 115, in accordance with an embodiment of the present invention. In step 305 the data source is normalized. Normalization may include simple transformations such as removing extra white space.

In step 310, metadata is generated from the normalized data source. Methods for generation of metadata from data sources will become evident as the invention is further described. For example, the embodiments depicted in FIGS. 5A-5F may be used in implementing this step. However, it will be appreciated that step 310 is not limited to embodiments depicted in FIGS. 5A-5F.

In step 315, the metadata from step 310 is analyzed to produce transformed metadata. For example, a context analysis may be performed on the metadata from step 310 to generate the transformed metadata. For example, the embodiments depicted in FIGS. 6-8 may be used in implementing step 315. However, it will be appreciated that step 315 is not limited to embodiments depicted in FIGS. 6-8.

Step 320 is generation of references. For example, the embodiment depicted in FIG. 9 may be used in implementing step 315. However, it will be appreciated that step 320 is not limited to embodiments depicted in FIG. 9.

Figure 3B:
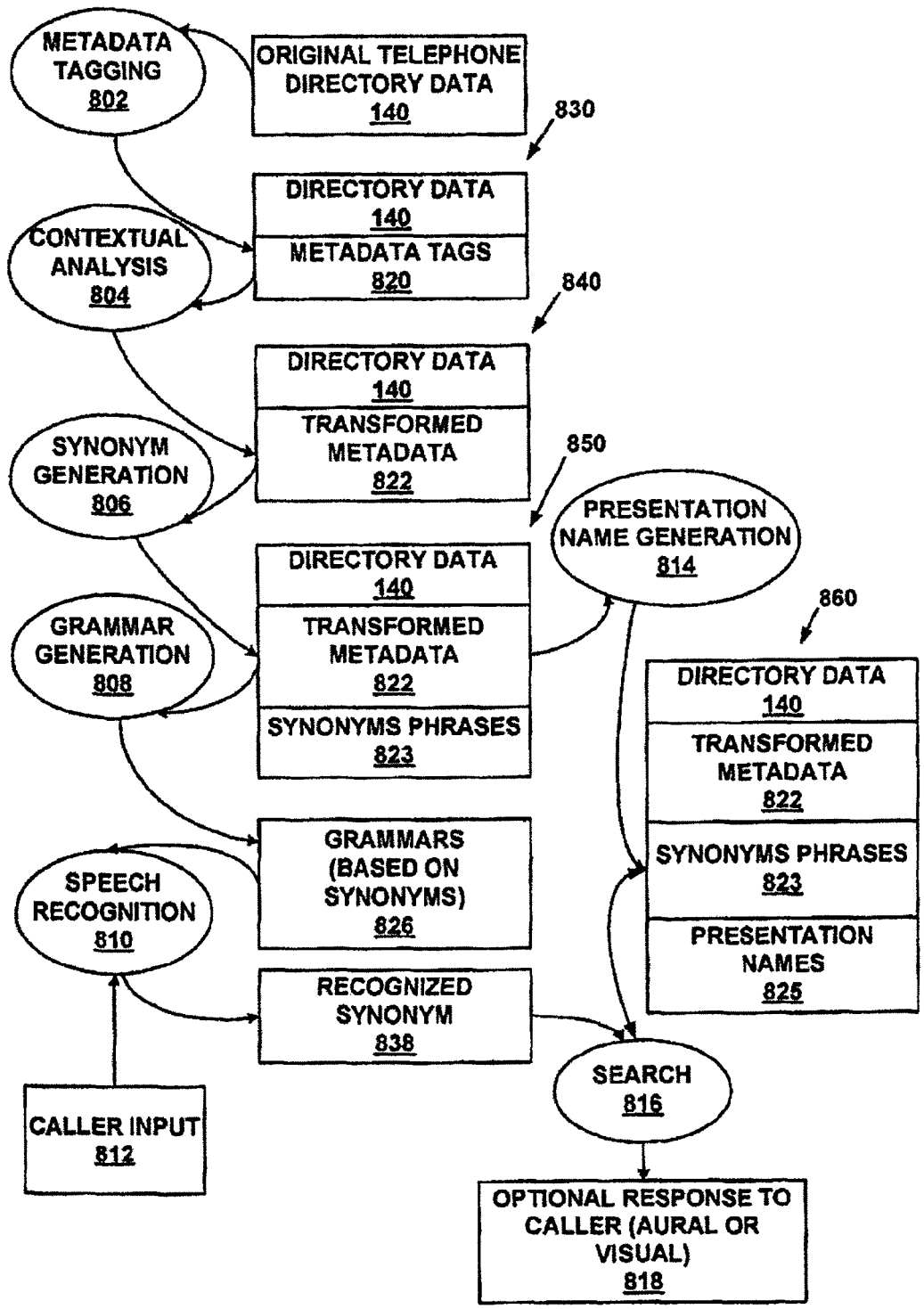
FIG. 3B is a diagram illustrating steps of a process of generating reference variances along with inputs and outputs of the steps, in accordance with an embodiment of the present invention.

FIG. 3B is a diagram illustrating steps of a process of generating reference variances along with inputs and outputs of the steps, in accordance with an embodiment of the present invention. The metadata tagging step 802 inputs original telephone directory data 140, generates metadata tags 820 based on the original telephone directory data 140, and outputs metadata tagging output 830 comprising the directory data 140 with the metadata tags 820.

Continuing with the discussion of FIG. 3B, the contextual analysis step 804 inputs metadata tagging output 830 and generates transformed metadata 822 based on the contextual analysis. The contextual analysis output 840 comprises directory data 140 and transformed metadata 822.

Continuing with the discussion of FIG. 3B, the reference generation step 806 inputs the contextual analysis output 840 and generates synonym phrases 823 based thereon. The synonym generation output 850 comprises directory data 140, the transformed metadata 822, and the synonym phrases 823.

Continuing with the discussion of FIG. 3B, the grammar generation 808 inputs the reference generation output 850 and generates and outputs grammars 826 based on the synonym phrases 823. The speech recognition inputs the grammars 826 and caller input 812. Based on the grammars 826, synonym phrases 828 may be recognized by the speech recognition 810.

Continuing with the discussion of FIG. 3B, the presentation name generation 814 inputs the synonym generation output 850 and generates presentation names 825 based thereon. The presentation name generation output 860 comprises directory data 140, the transformed metadata 822, the synonym phrases 823, and the presentation names 825.

Continuing with the discussion of FIG. 3B, the recognized synonym phrases 828 and the presentation name generation output 860 are input by a search engine 816, which may search, for example, a telephone directory database. Based on the search results, a response 818 may be sent to a caller.

The optional response may be one or more of the presentation names 825, which in turn are based on the synonym phrases 823.

Figure 4:
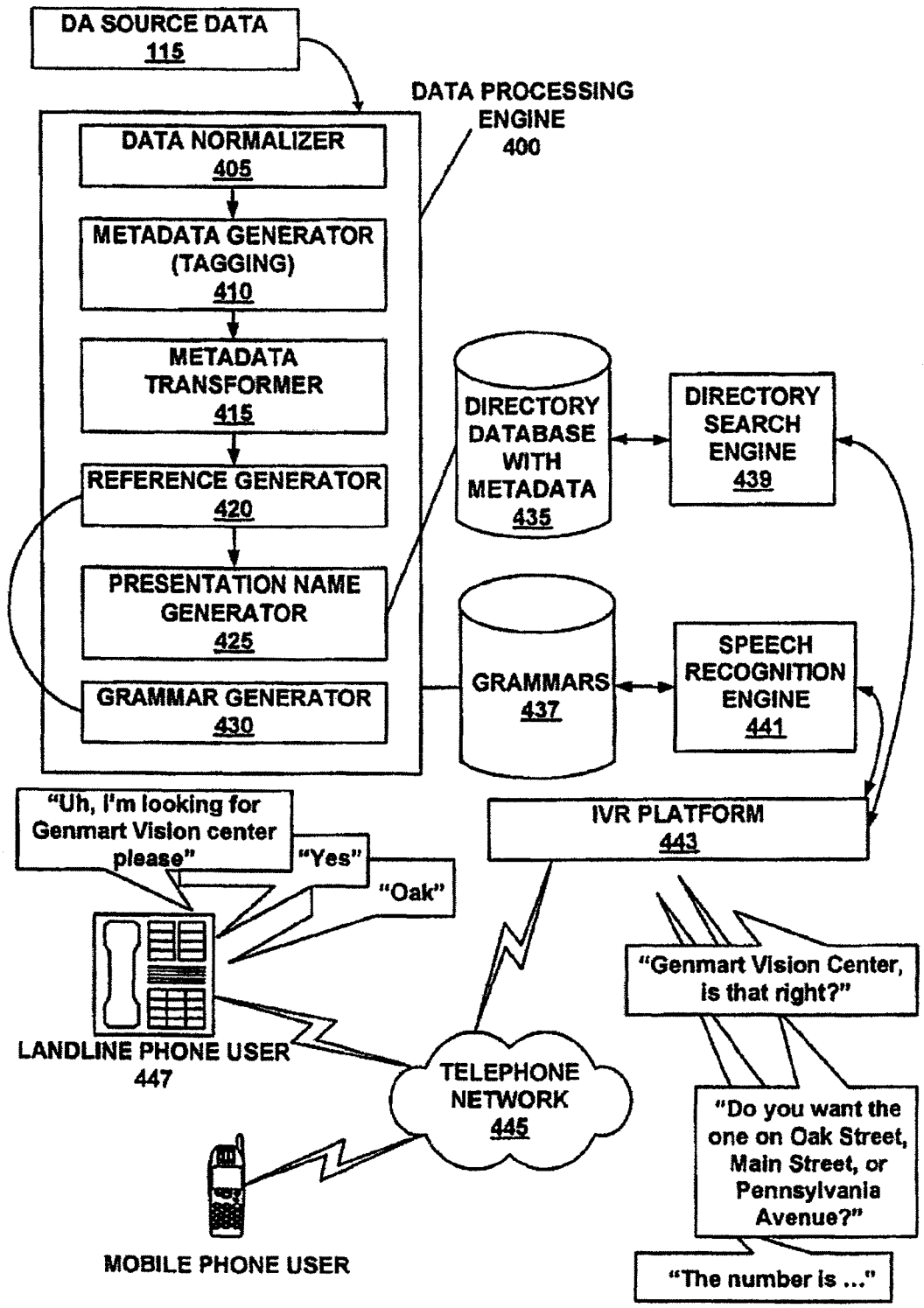
FIG. 4 is a block diagram illustrating modules used to automatically generate input parameters to speech recognition, in accordance with an embodiment of the present invention.

FIG. 4 is a block diagram illustrating modules used to automatically generate input parameters to speech recognition, in accordance with an embodiment of the present invention. The various modules in the data processing engine 400 may be implemented as instructions stored in a computer readable medium and executed in a computer processor.

The data processing engine 400 accesses DA source data 115, which are normalized by data normalization module 405. The data processing engine 400 comprises a tagging metadata generator 410 that generates metadata tags based on the normalized DA source data. In one embodiment, the tagging metadata generator 410 includes a number of taggers that are able to determine the meaning of portions of DA source data (e.g., telephone directory information). Taggers examine features of individual listings. Exemplary taggers include, but are not limited to, taggers that detect known businesses, main telephone numbers (e.g., store, general information), departments (e.g., radiology, menswear), main number departments (e.g., food, grocery, reservations), business types (pizza, flowers), addresses/locations (e.g., 1234 Main St., Acme Mall, San Jose International, Seattle), subheaders (e.g., stores, branch locations), personal names (e.g., Smith, David), abbreviations (e.g., Ins., St., Dr.).

The data processing engine 400 also comprises metadata transformer 415, which modifies the metadata information from the tagging metadata generator 410 based on a contextual analysis. The metadata transformer 415 may comprise one or more contextual handlers that are able to determine semantic relevancy of the tags generated by the metadata transformer 415. For example, the metadata transformer 415 looks across listings to perform tasks such as resolving tag conflicts or suppressing over-generated tags. Thus, an aspect of metadata transformer 415 may be referred to as contextual tag adjustment (CTA). However, the metadata transformer 415 is not limited to contextual tag adjustment.

The metadata transformer 415 applies rules to the metadata information based on what the metadata concerns. For example, hospitals, retail stores, governments, etc. can be handled differently. Thus, the directory source data may be processed by one or more of the context handlers, depending on the nature of the metadata.

The reference generator 420 accesses transformed metadata as modified by the metadata transformer 415 and is able to generate reference variances (e.g., synonym phrases) based thereon. The reference variances can be used by the grammar generator 430 to generate grammars stored in grammar database 437 coupled to speech recognition engine 441. This allows the reference variances to facilitate speech recognition.

Furthermore, the reference variances are input to presentation name generator 425, which generates presentation names based thereon. Presentation names are names that may be returned to a caller by audio or textual means. Moreover, the presentation names and synonym phrases are input to the directory database with metadata 435. The directory database with metadata 435 includes telephone directory information (e.g., telephone numbers and listings), transformed metadata, reference variances (e.g., synonym phrases, normalized addresses), and presentation names. Therefore, the automatically generated reference variances and presentation names may be used to facilitate searching the directory database 435.

Callers can access Interactive Voice Response (IVR) platform 443 via telephone network 445. Callers may use landline phones 447, mobile phones 449, etc. The IVR platform 443 accesses the speech recognition engine 441 and the directory search engine 439.

For example, a caller query might be, "Uh, I'm looking for Genmart Vision Center please." The IVR platform 443 receives this caller input and accesses speech recognition engine 441. Speech recognition utilizes the grammars 437 based on the synonym phrases. Synonym phrases such as "Genmart Vision Center" may be recognized by the speech recognition engine 441, wherein the IVR platform 443 responds to the caller with the confirmation including the presentation name "Genmart Vision Center." In response to the caller indicating "Genmart Vision Center" is correct, the IVR platform 443 accesses the directory search engine 439 to perform a search for Genmart Vision Center. The generated synonym phrases and presentation names may be used in this and other searches of the directory database 435. Upon discovering that multiple listings might satisfy the caller's request, the IVR platform 443 queries whether the caller wants the one on Oak Street, Main Street, or Pennsylvania Avenue. In response to the caller indicating "Oak," the IVR platform 443 accesses the directory search engine 439 to search for the relevant telephone number. The generated synonym phrases and presentation names may be used in this search. The IVR platform 443 then provides the caller with the correct telephone number.

Figure 5A:
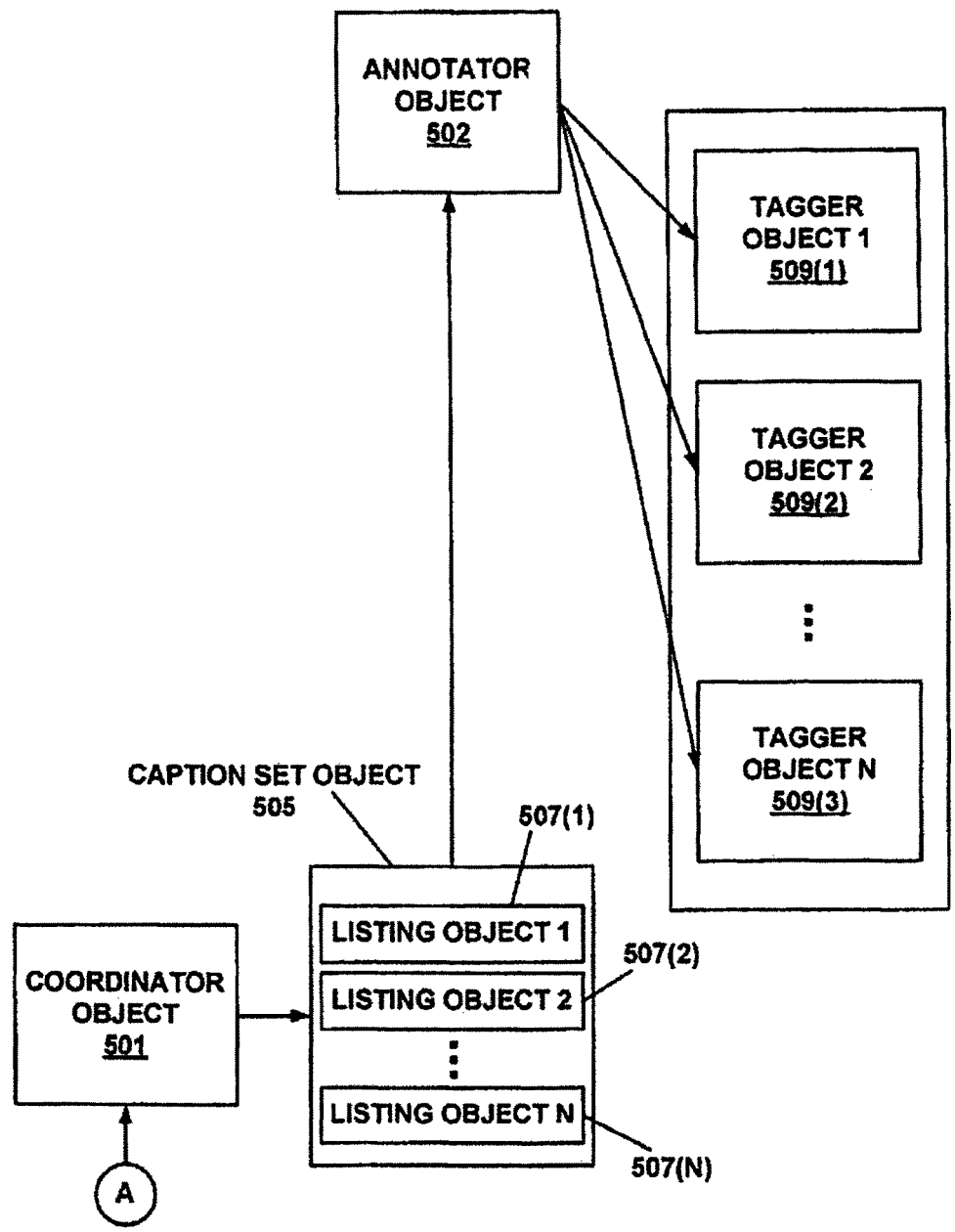
FIG. 5A illustrates a metadata generator process according to one embodiment of the present invention.
Figure 5A:
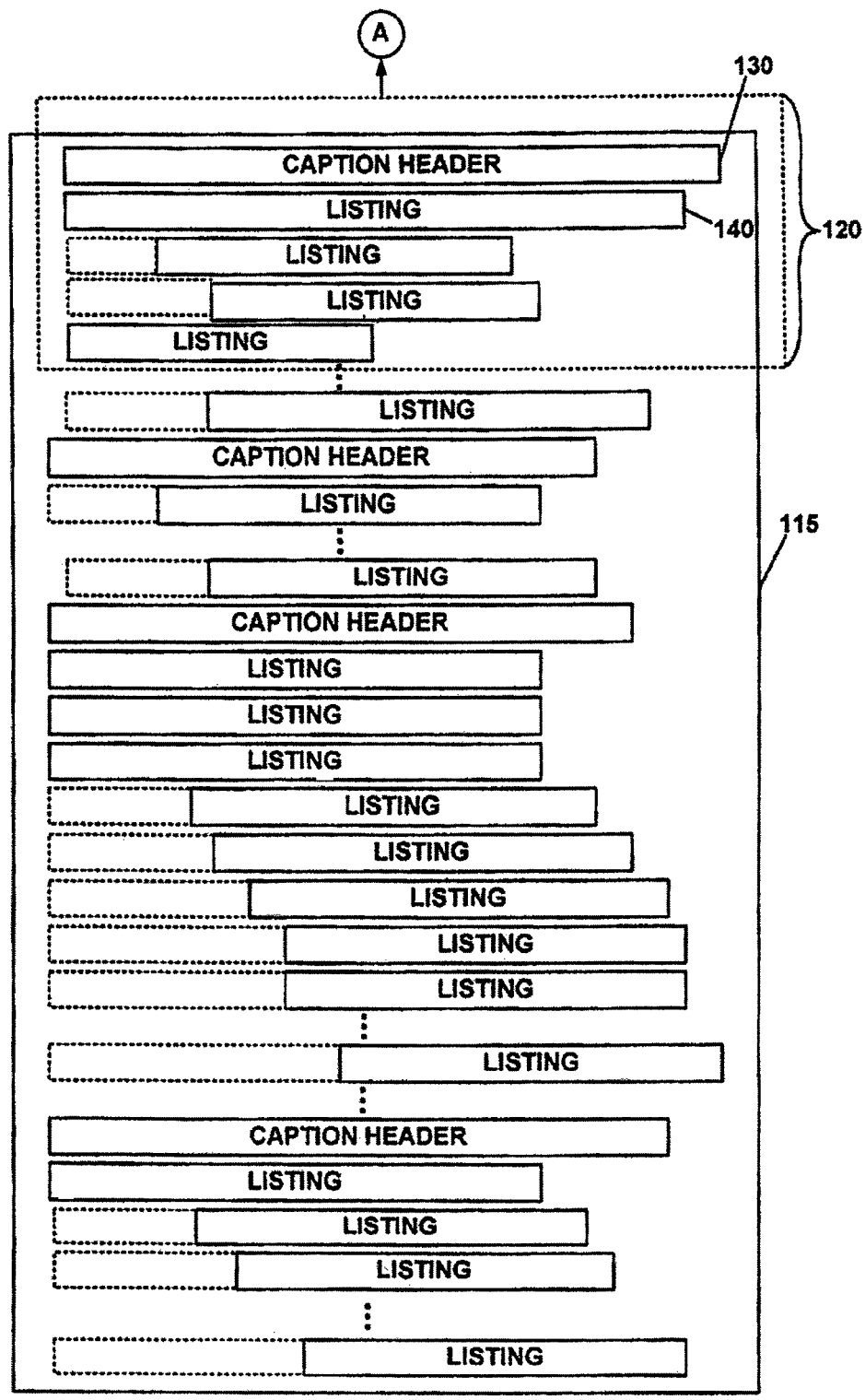

FIG. 5A illustrates a metadata generator process according to one embodiment of the present invention. Coordinator object 501 is, a software object that orchestrates a process for generating metadata for DA source data. According to one embodiment of the present invention, coordinator object 501 generates a respective caption set object 505 for each caption set located in DA source data 115. According to one embodiment of the present invention, coordinator object 501 locates caption sets 120 in DA source data 115 by searching for listings 140 residing at indentation level 0. Caption set object 505 is a container object that stores a plurality of listing objects 515(1)-515(N), which respectively encapsulate actual listing data for a caption set 120. That is, each listing object 507 stores the actual text of a listing from DA source data 115. According to one embodiment, caption set object 505 also includes a plurality of methods for traversing listing objects 507(1)-515(N) stored in caption set object 505. For example, caption set object may include iterator methods, accessor methods, etc.

Coordinator object 501 passes each caption set object 505 to annotator object 502. Annotator objects invoke a plurality of tagger objects that operate on the caption set object. In particular, tagger objects 509 generate metadata tag objects, which are associated with particular listing objects contained in caption set object 505. The operation of an exemplary tagger object is described in detail below with respect to FIG. 5D.

Figure 5B:
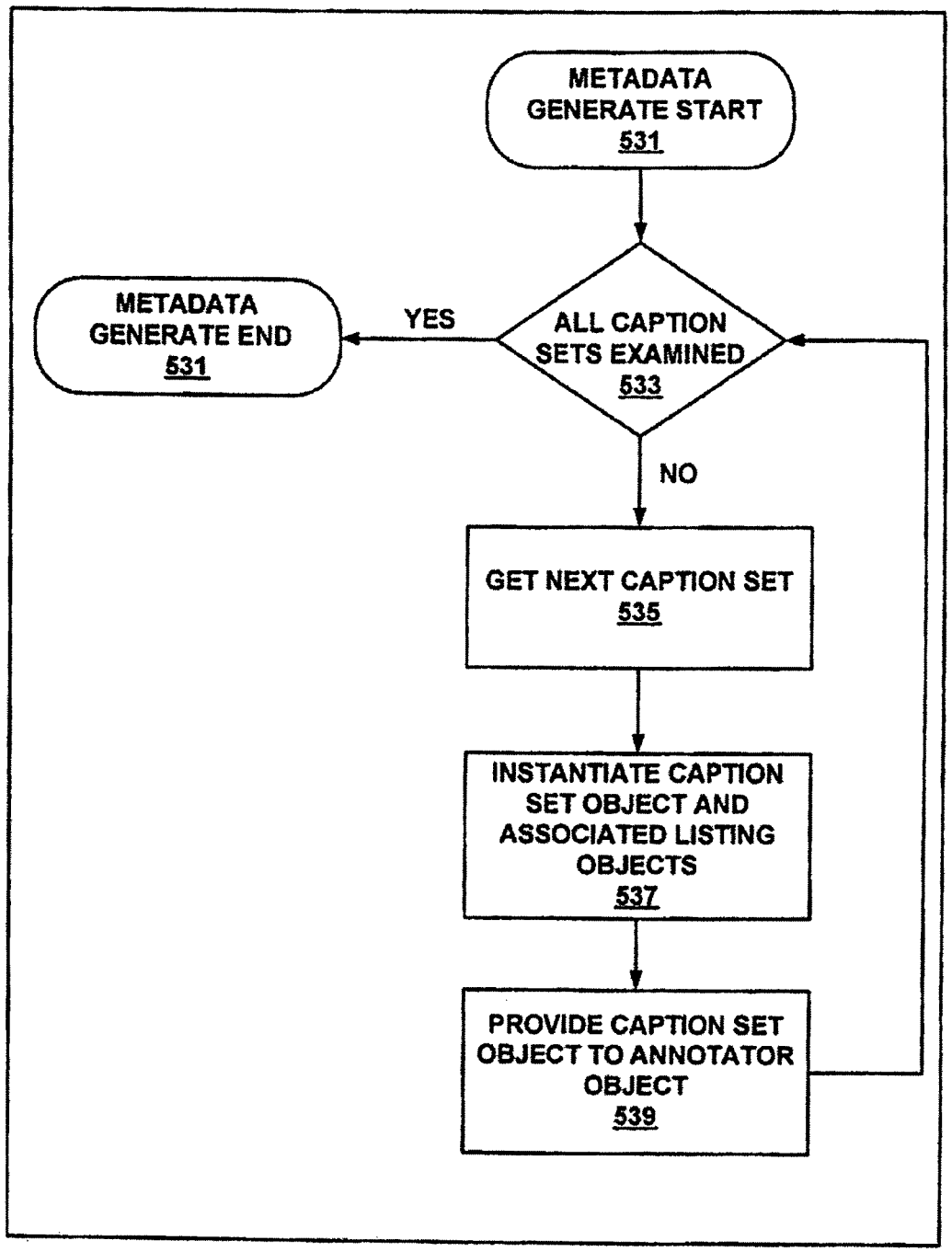
FIG. 5B is a flowchart depicting operation of a coordinator object according to one embodiment of the present invention.

FIG. 5B is a flowchart depicting the operation of a coordinator object according to one embodiment of the present invention. The process is initiated in step 531. In step 533, it is determined whether all caption sets from the DA source data have been examined. If so ("yes" branch of step 533), the process ends in step 541. Otherwise ("no" branch of step 533), flow continues with step 535 and the next caption set is extracted from the DA source data. In step 537, a new caption set object is instantiated. In addition, listing objects are instantiated corresponding to all listings in the caption set from the directory source data. The caption set object is then populated with the associated listing objects. In step 539, the now fully generated caption set object is provided to annotator object 502. Flow then continues with step 533.

Figure 5C:
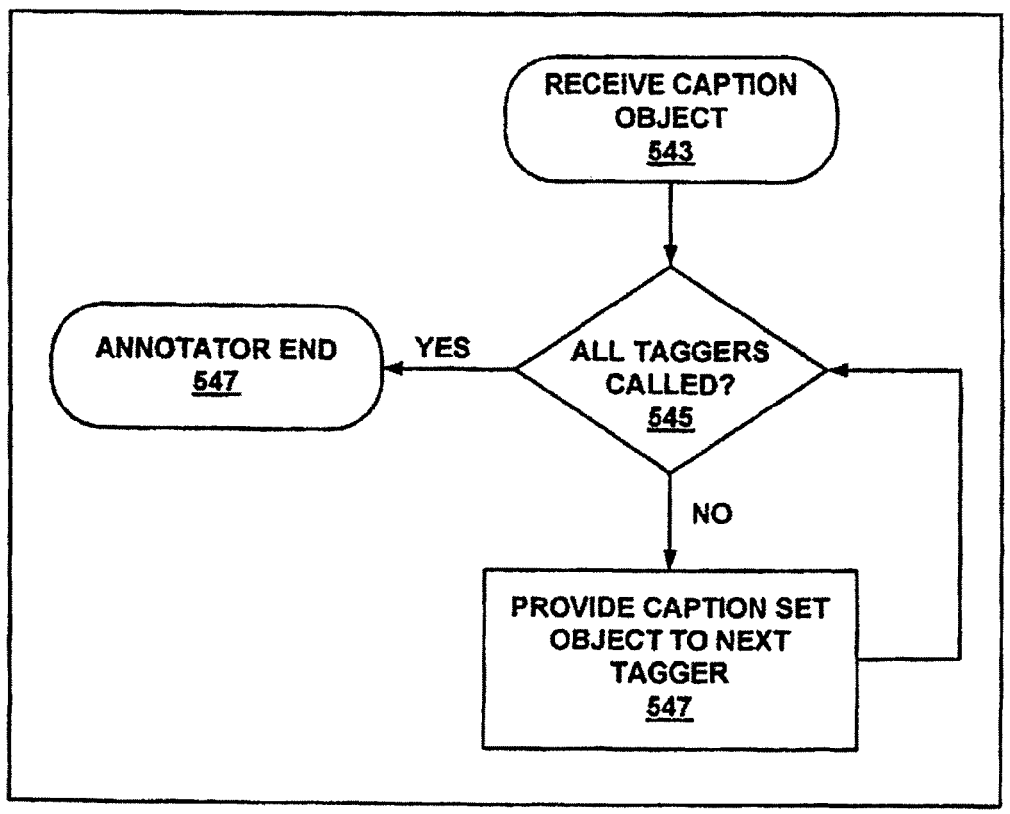
FIG. 5C is a flowchart depicting operation of an annotator object according to one embodiment of the present invention.

FIG. 5C is a flowchart depicting the operation of an annotator object according to one embodiment of the present invention. The process is initiated in step 543 in which a caption object is received. In step 545 it is determined whether all tagger objects have operated on the received caption object. If so ("yes" branch of step 545), in step 549, the process ends. Otherwise, in step 547, the received caption set object is provided to the next tagger object.

Figure 5D:
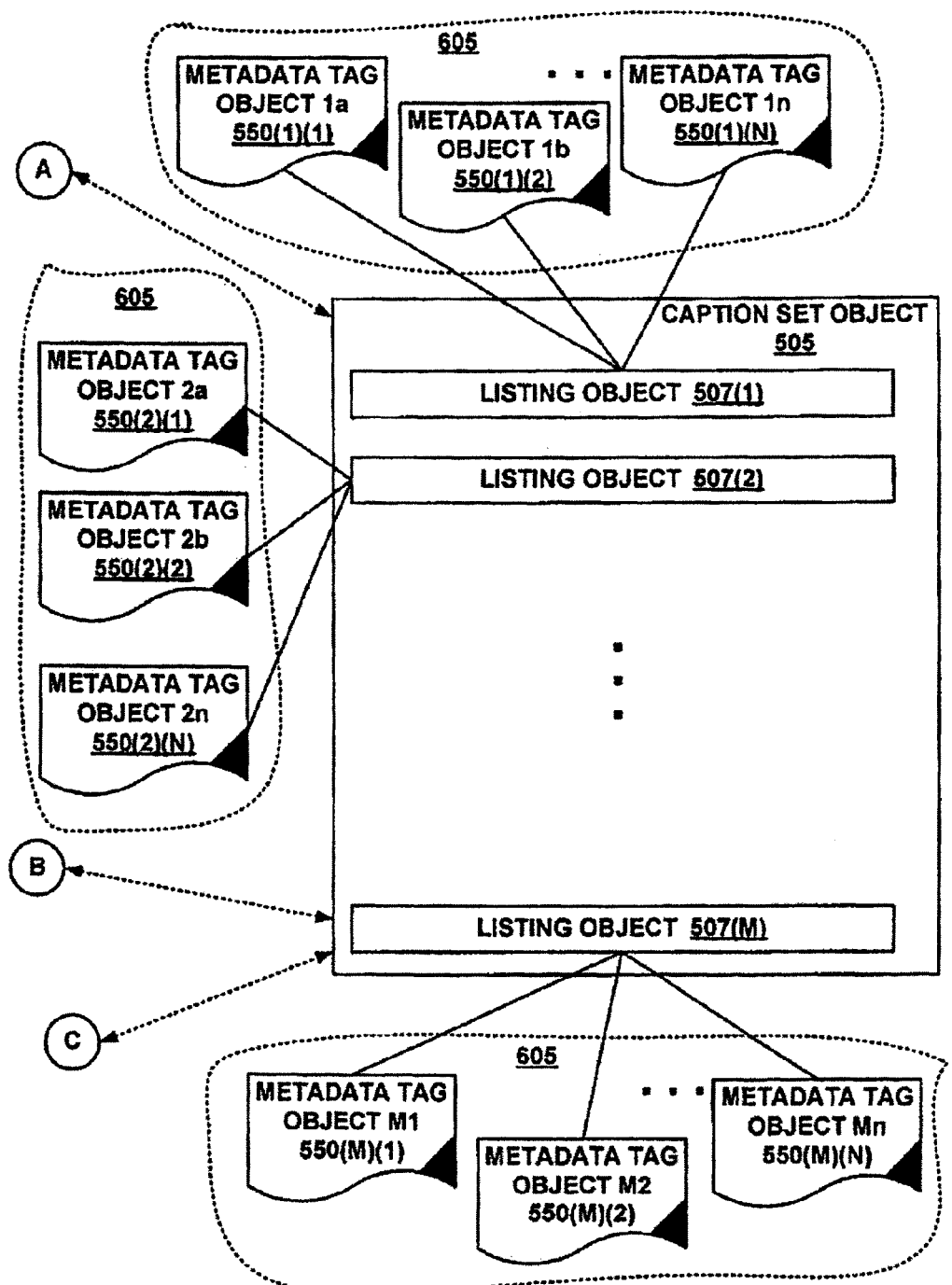
FIG. 5D is a block diagram depicting operation of tagger objects according to one embodiment of the present invention.
Figure 5D:
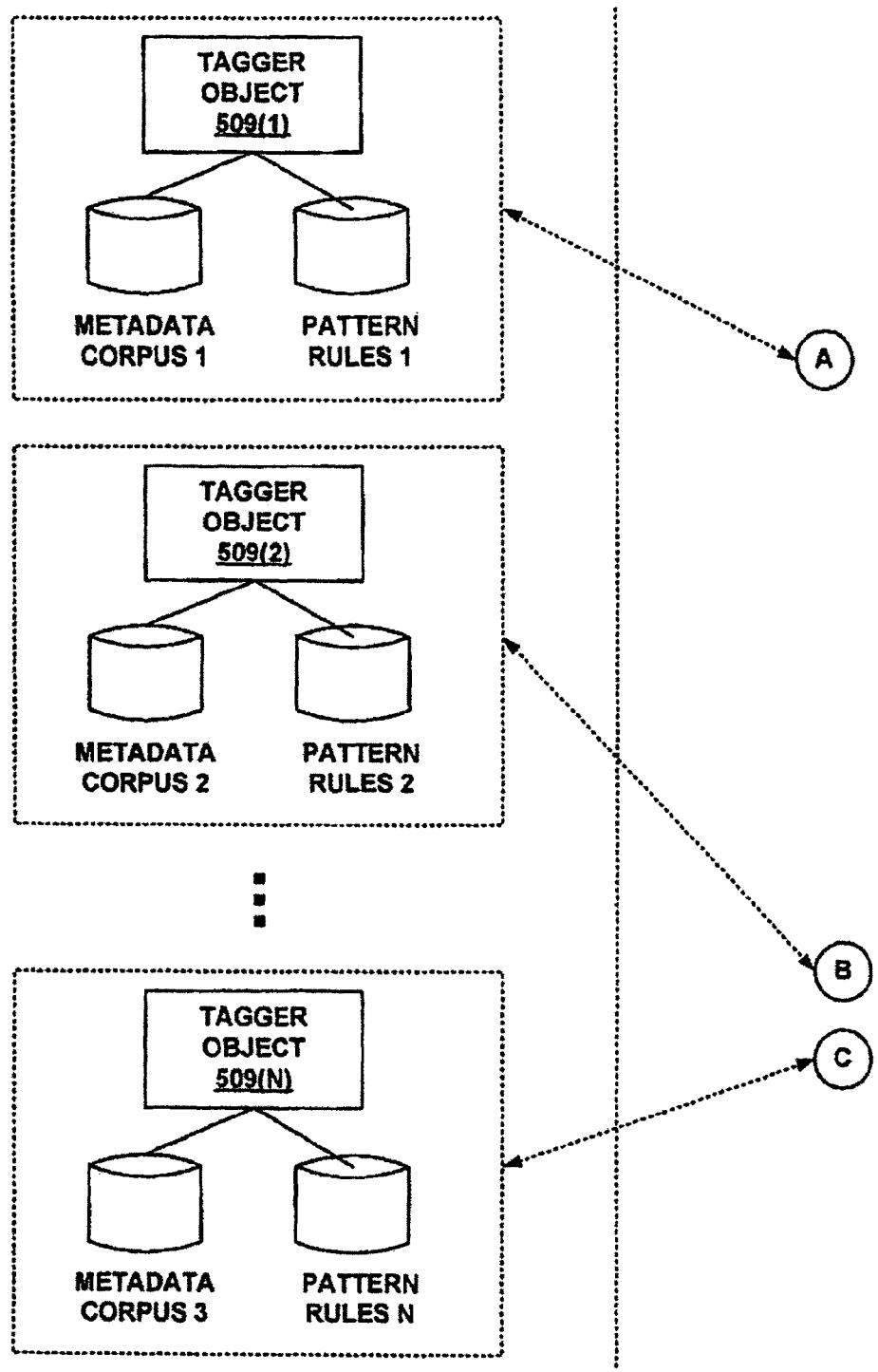

FIG. 5D is a block diagram depicting the operation of a plurality of tagger objects according to one embodiment of the present invention. As shown in FIG. 5D, tagger object 1-tagger object N cause listing objects contained in caption set object to become associated with metadata tag objects. In particular, referring to the example in FIG. 5D, tagger objects 509(1)-509(N) have caused listing object 507(1) to be associated with metadata tag objects 550(1)(1)-550(1)(N), listing object 507(2) to be associated with metadata tag objects 550(2)(1)-550(2)(N) and listing object 507(M) to be associated with metadata tag objects 550(M)(1)-550(M)(N). Note that this example is merely for illustration purposes. In some instances tagger objects 509(1)-509(N) may not associate any metadata tag objects 550 with a particular listing object 507.

As shown in FIG. 5D, each tagger object 509(1)-509(N) utilizes a respective dictionary 511(1)-511(N) and pattern rules database 512(1)-512(N) to generate metadata for DA data source 115. Pattern rules databases 512(1)-512(N) respectively store representations of text string patterns for words stored in respective dictionary 511(1)-511(N), that may occur within DA data source 115 and are of interest to respective tagger 509(1)-509(N). The existence of a particular string pattern triggers the generation of metadata describing the content of the string pattern. For example, according to one embodiment of the present invention, taggers 509(1)-509(N) may perform pattern matching using a context free grammar, which is represented through the combination of a pattern rules database 509 and dictionary 511.

Figure 5E:
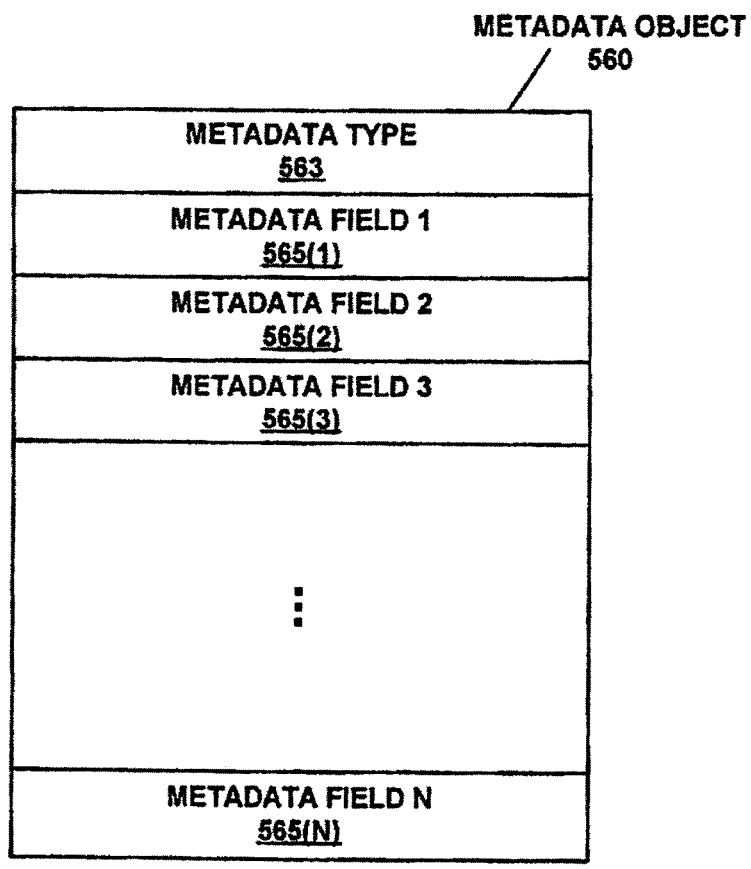
FIG. 5E illustrates the structure of a metadata object according to one embodiment of the present invention.

FIG. 5E illustrates the structure of a metadata object according to one embodiment of the present invention. Metadata object 560 includes metadata type field 563 and metadata fields 565(1)-565(N). Metadata type field stores information indicating a particular metadata type. For example, in the context of directory assistance metadata types may include:

Known entities (hand-selected known businesses or institutions, such as chains like Walmart or Home Depot, hospitals like Stanford Hospital, or even local businesses).

Addresses (e.g., street-type addresses like "123 Main St.," institution-type addresses like "Acme Shopping Center," airport-type addresses like "SJC International," pseudo-localities like "Cow Hollow" or "Lower Manhattan," etc.).

Departments (e.g., "Pharmacy" or "Men's").

Business Types (e.g., "Pizza" or "Flowers").

Locations (e.g., "Seattle").

Subheaders (e.g., "Branch Offices-").

Abbreviations (e.g., "St." or "Ins.").

Metadata fields 565(1)-565(N) store a set of fields associated with the metadata type. For example, for the metadata type address, metadata fields 565(1)-565(N) may store information such as "Street Address," "City," "State," "Zip Code," etc.

Figure 5F:
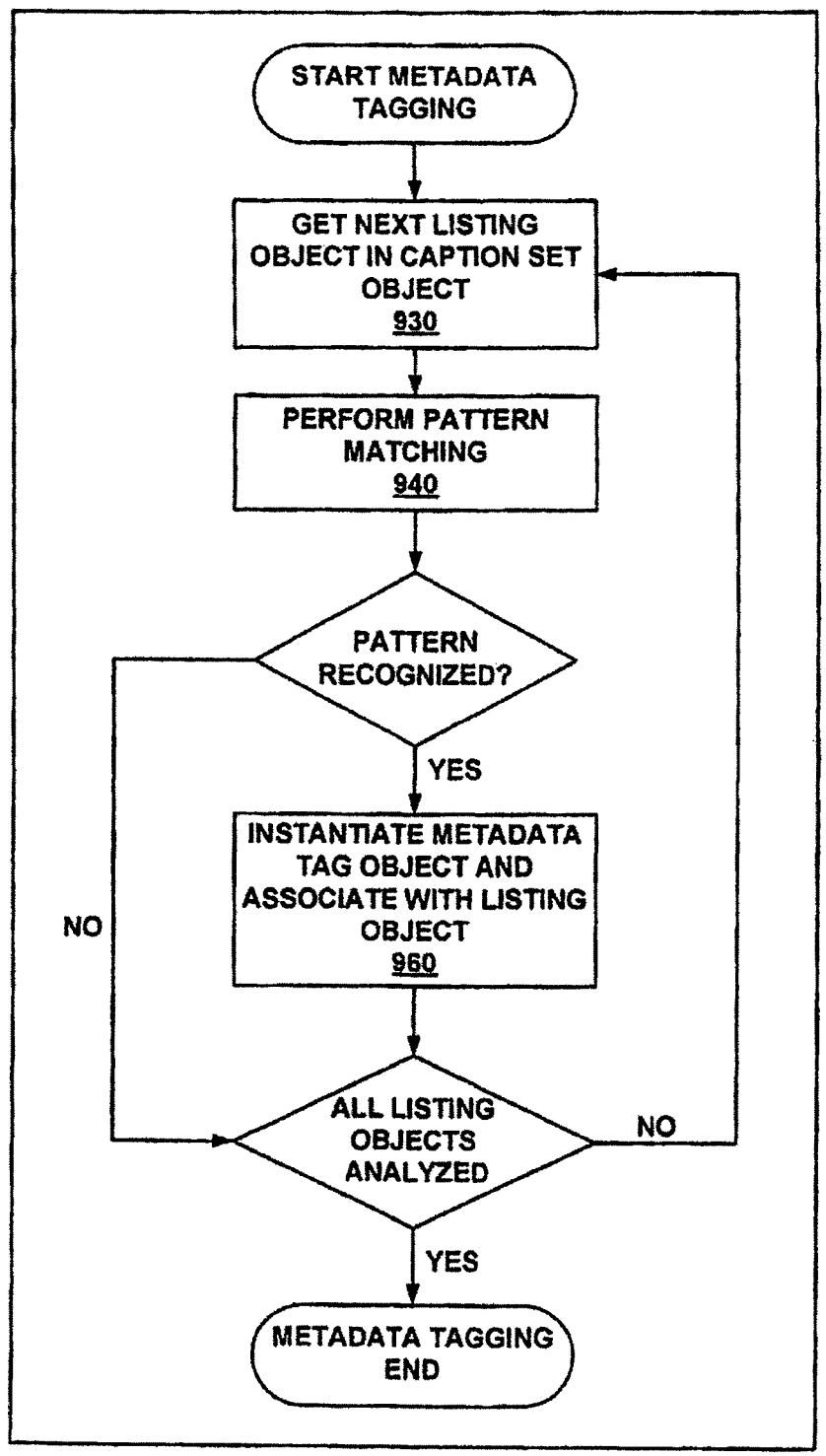
FIG. 5F illustrates a general tagger process, in accordance with an embodiment of the present invention.

FIG. 5F illustrates a tagger process, in accordance with an embodiment of the present invention. Step 930 is accessing the next listing object in caption set object. Step 940 is performing pattern matching. For example, if the tagger is an address tagger, the pattern that is being looked for might be "number, street name, thoroughfare." In this case the lexical corpus may include all street names in a relevant region for the street name portion of the pattern. The lexical corpus may comprise a listing of expected numbers for the number portion of the pattern. For the thoroughfare portion of the pattern, the corpus may contain elements such as "street," "avenue," "court," "lane," etc. (or abbreviations of these). The tagger uses the lexical corpus and the pattern to look for a match in the current data element under test. If the pattern is not recognized, the process returns to step 930 if there are more listing objects to analyze.

If the pattern is recognized, then in step 960 the process instantiates a metadata tag object and associates with a listing object. Using the current example, if the listing object is "123 Main Street," the address tagger would detect a pattern match. Thus, a metadata tag that indicates that this is an address would be associated with this listing object. After step 960, the process returns to step 930 if there are more listing objects to analyze.

Figure 6:
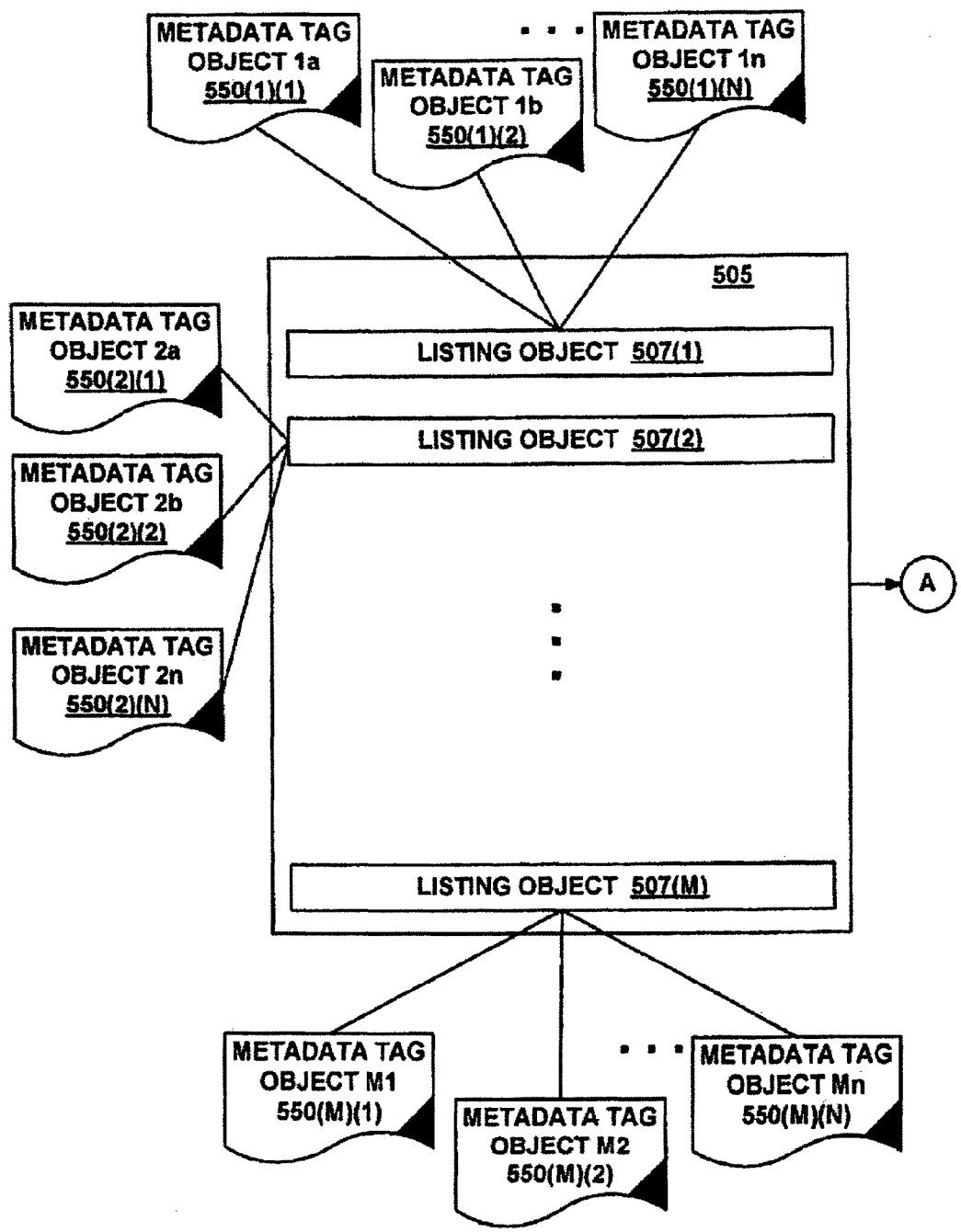
FIG. 6 illustrates a process for performing transformations on metadata according to one embodiment of the present invention.
Figure 6:
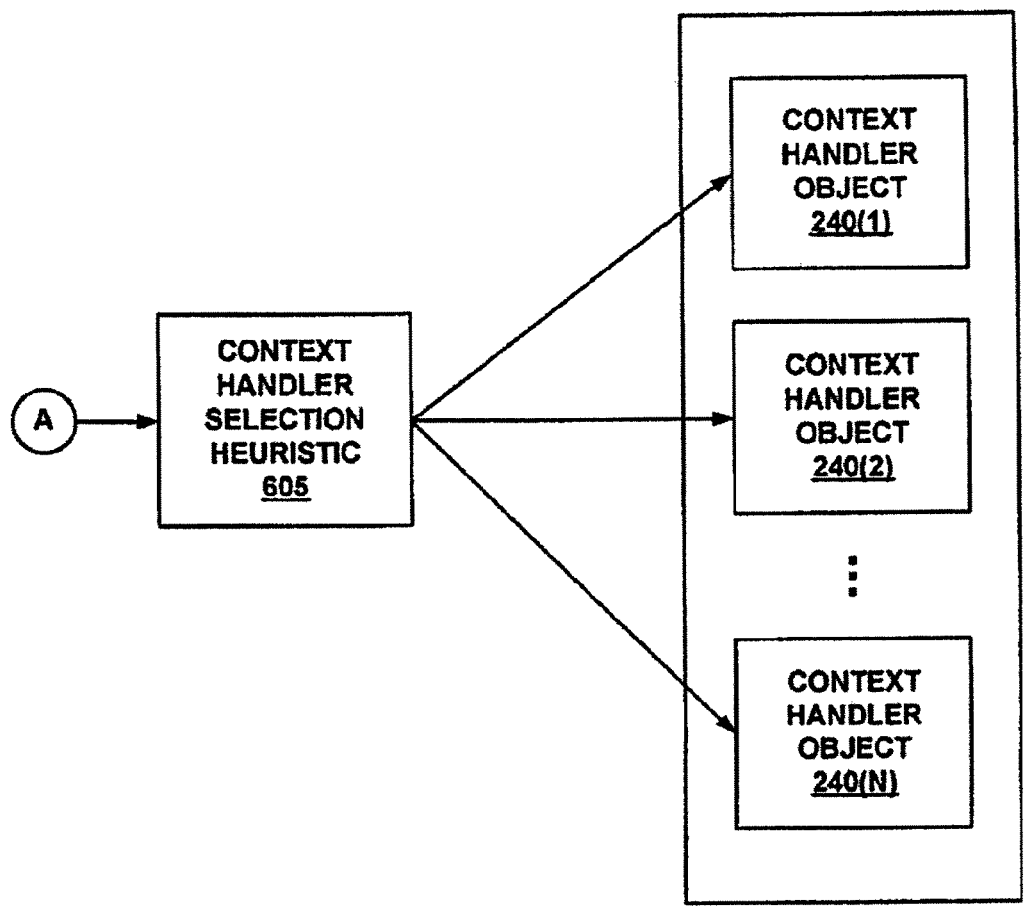

FIG. 6 illustrates a process for performing transformations on metadata according to one embodiment of the present invention. Context handler objects 240(1)-240(N) perform transformations on the metadata associated with particular listing objects 507 encapsulated in content handler object 505. For each caption set object 505, a content handler selection heuristic determines an appropriate content handler object to be invoked to perform metadata transformation. According to one embodiment of the present invention, context handler selection is performed as by performing heuristic analysis on the caption header associated with a caption set.

Figure 7:
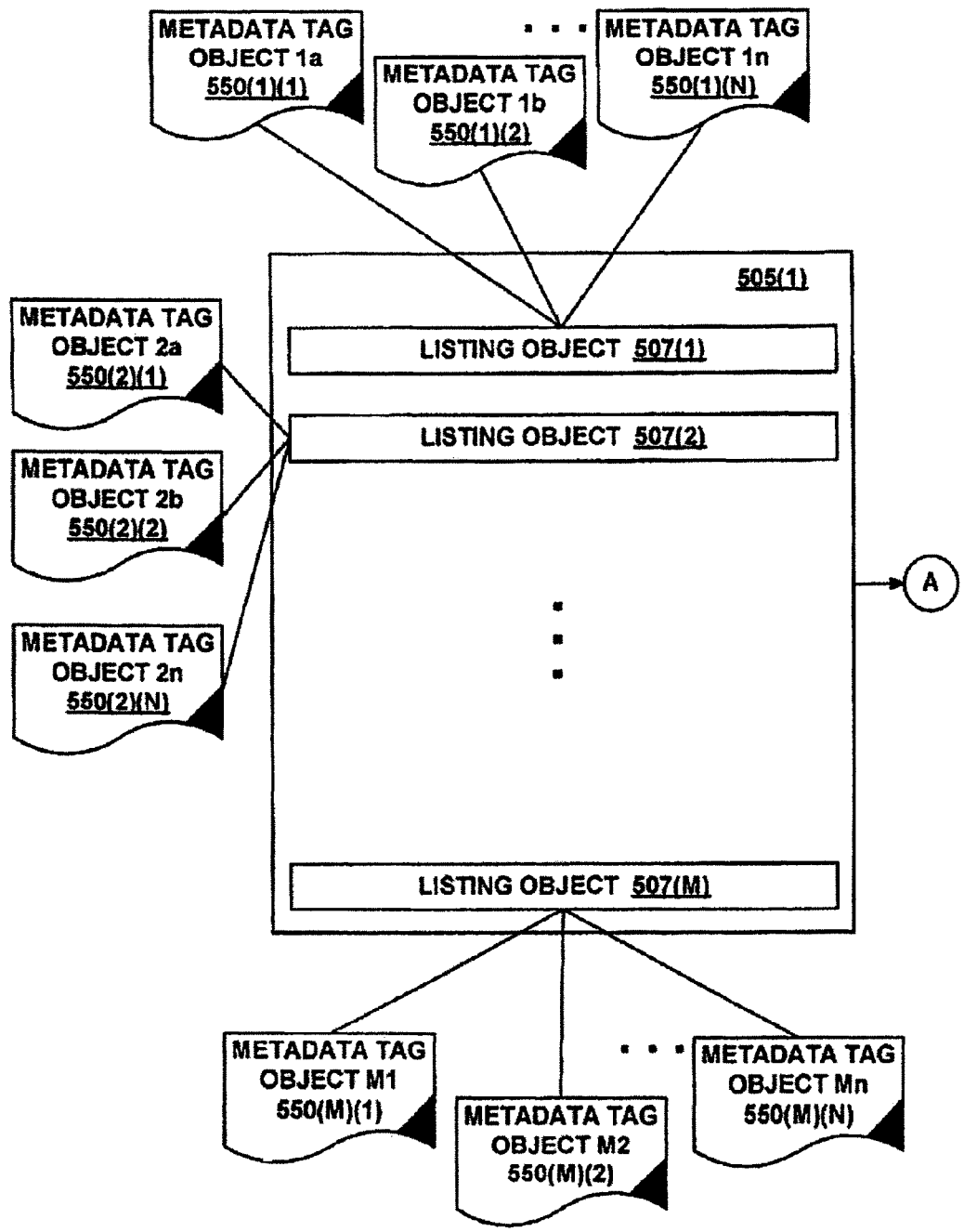
FIG. 7 illustrates the operation of a context handler object according to one embodiment of the present invention.
Figure 7:
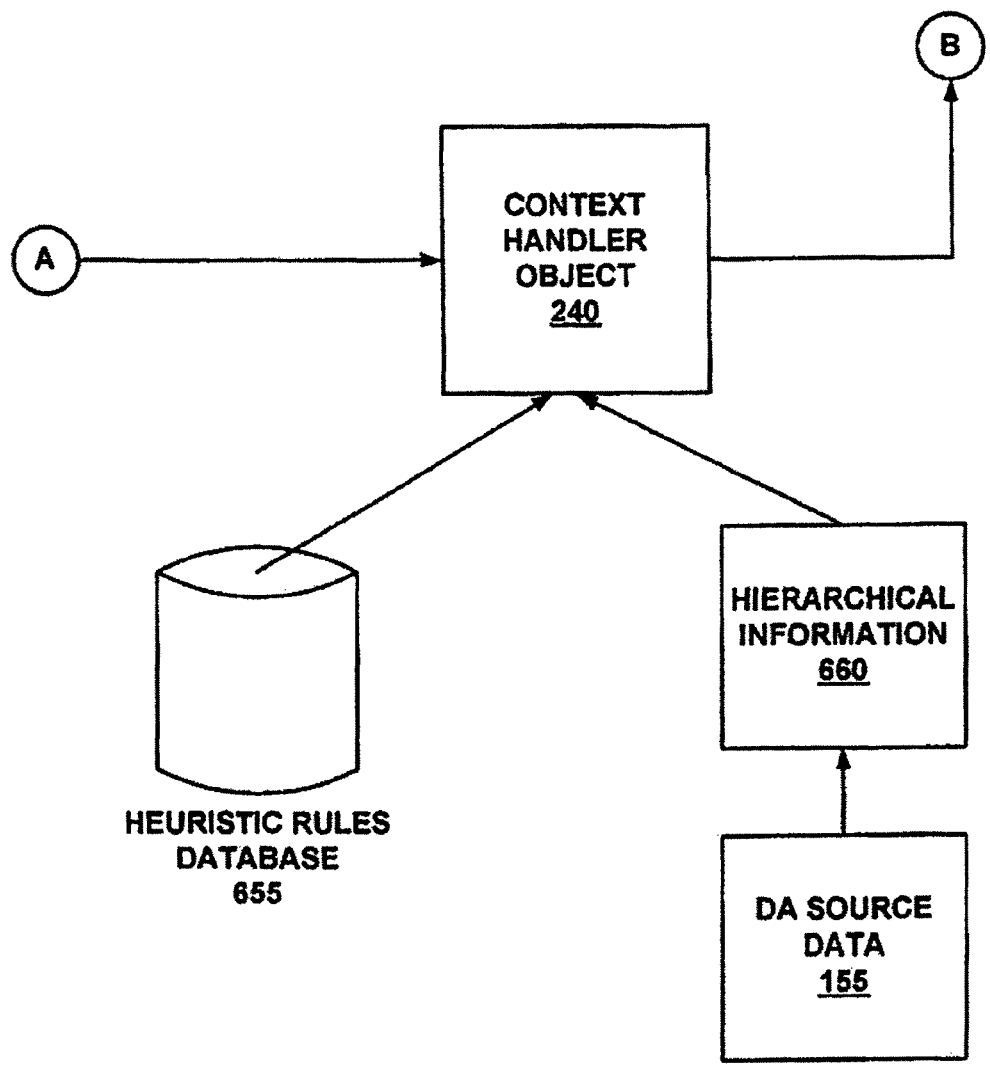
Figure 7:
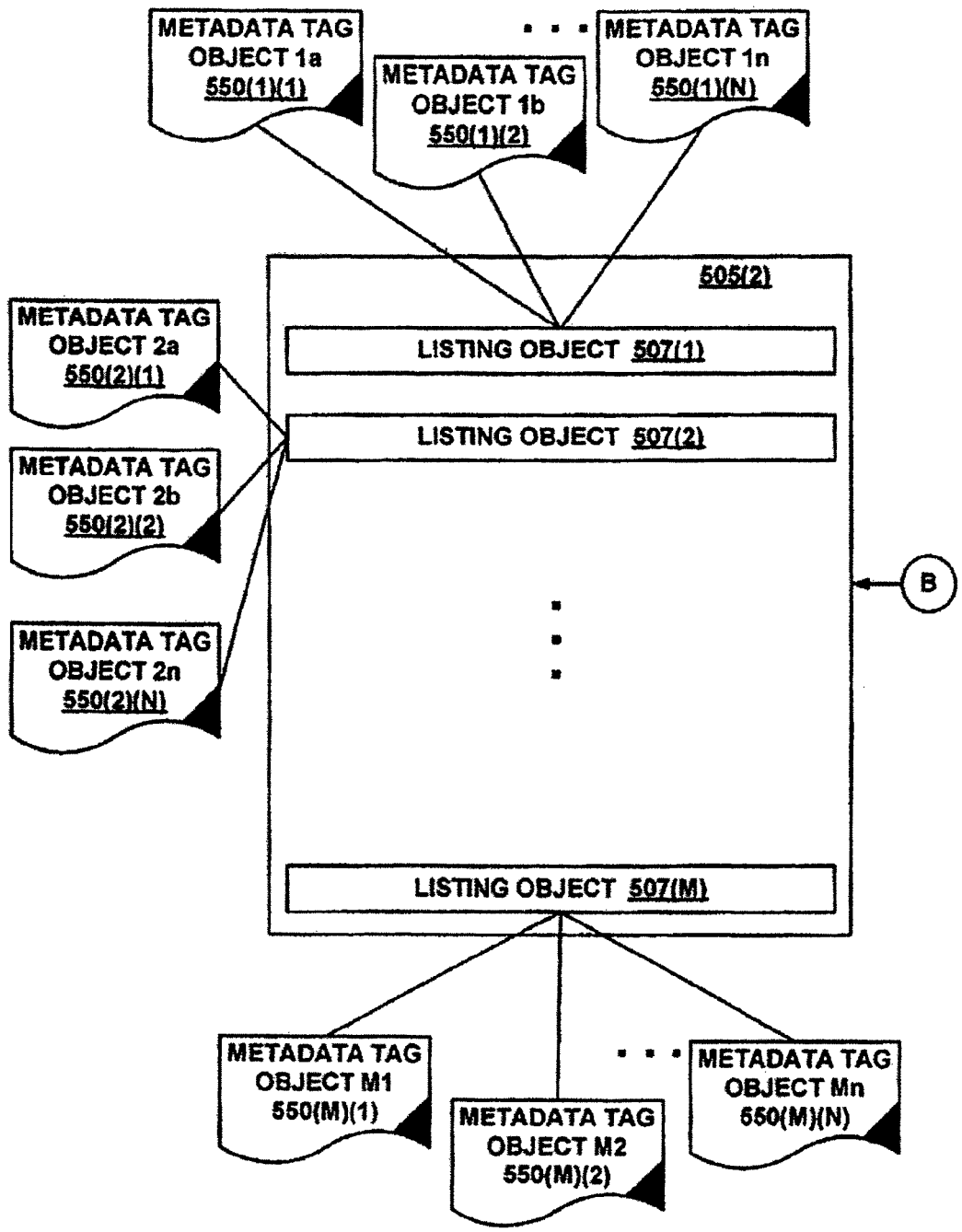

FIG. 7 illustrates the operation of a context handler object according to one embodiment of the present invention. Context handler object 240 receives caption data object 505(1) and generates transformed caption data object 505(2). In particular, caption data object 505(2) is generated from caption data object 505(1) by removing, adding, or merging particular metadata tags. A particular heuristic rule may analyze the relationship of metadata tags associated with listing objects as well as hierarchical information 660 relating to the listings themselves. According to one embodiment of the present invention, hierarchical information 660 is determined from DA source data by analyzing indentation levels for particular listings.

Figure 8:
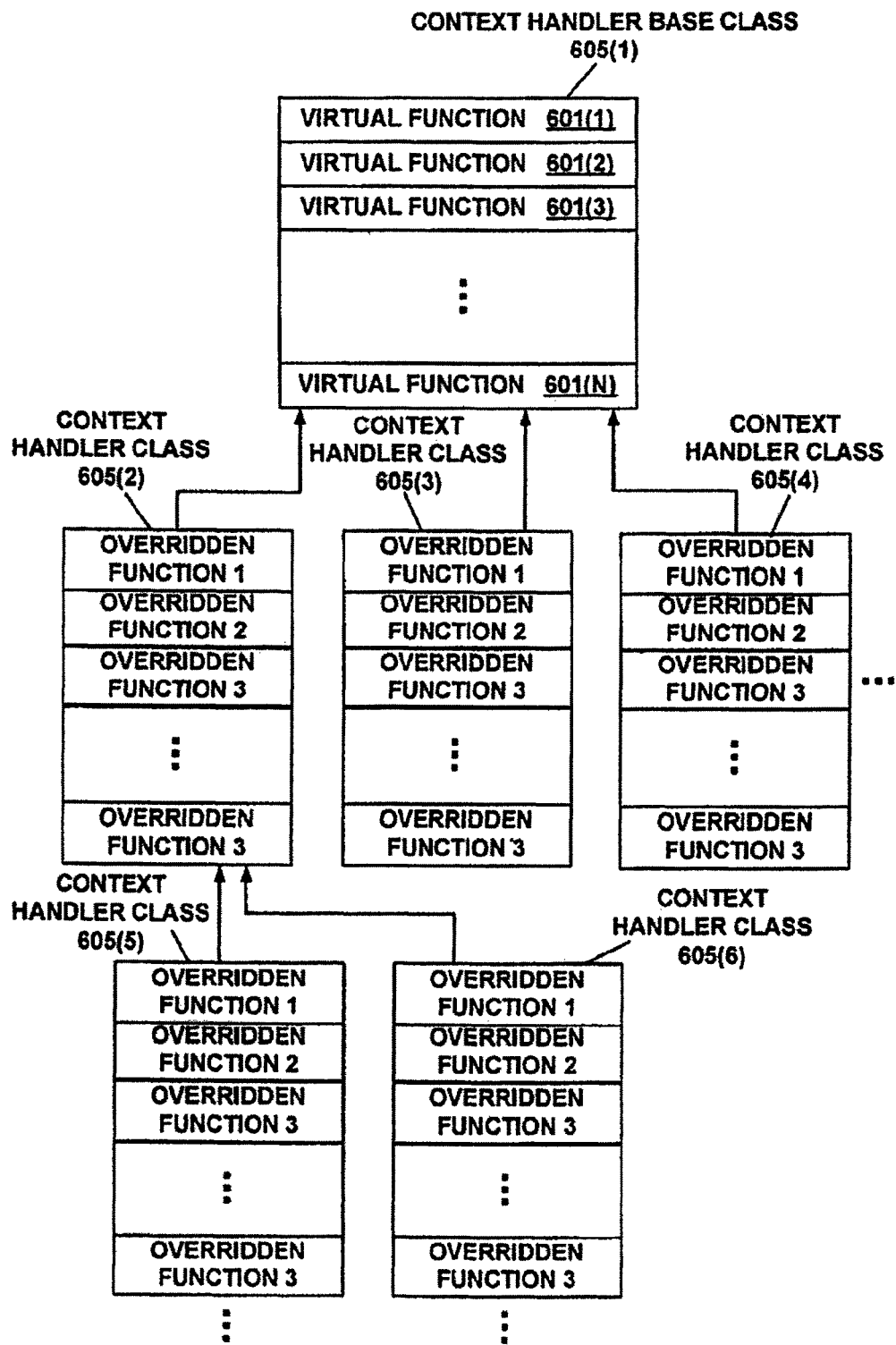
FIG. 8 depicts a class hierarchy for context handler objects according to one embodiment of the present invention.

FIG. 8 depicts a class hierarchy for context handler objects according to one embodiment of the present invention. As shown in FIG. 8, a context handler base class 605(1) includes a plurality of virtual functions 601(1)-601(N). Virtual functions 601(1)-601(N) define particular transformations to be applied on metadata. Context handler classes 605(2)-605(6) are inherited from context handler base class 605(1) and thereby may inherit the behavior of base class 605(1) or override the functions of base class 605(1).

According to one embodiment of the present invention, the following are examples of transformation functions:

Address downpopulation. Addresses found in a hierarchy are generally populated down to their children and other descendants in the caption, e.g.:

| | |
|---|---|
| Gen*Mart | |
| 123 Main St. | Tag: Address |
| Store | ← Inherits address tag from parent |
| Pharmacy | ← Also inherits address tag |

Tag conflict resolution. If there are multiple tags of a certain type, there is logic for eliminating conflicts. E.g., if there are multiple known entity tags, it is ensured that only one remains (heuristics including but not limited to using left-most longest match are employed).

Abbreviation resolution. Using business-type (or other features) of the caption, such as the caption header, abbreviation conflicts are expanded appropriately. E.g., "Ins." in an insurance caption will be expanded to "insurance," whereas it might become "institute" or "immigration and naturalization services" in another.

Tag overlap resolution. If multiple metadata tags apply to a given line of a caption set, rules are employed to eliminate some that can not coexist. For example, a detected Business Type is removed if it is to the left of a Department.

Main number selection. There are rules and lexicons per business type (e.g., "grocery store" behaves differently than "airline") for determining which line(s) within the caption specify the main number for that business or business location. Techniques include:

Using textual lists (e.g., "grocery" is an acceptable main number for a grocery store, as would be more general classes like "main" or "store").

Using detected addresses or location information.

Using operator release data to select most probable match based on which numbers are released more by human operators.

Using "simple number" heuristics, such as finding the number with the most trailing 0's or other digit (e.g., 930-9000 or 930-1111 being more "simple" than 930-9425).

Using indent level position; e.g. higher level lines in a caption take precedence over lower level lines.

Passing through other tags, particularly department tags, means that main numbers found as descendants are likely the main number for the department, not the overall entity.

Entity selection. Determining which children in a caption set are entities by themselves. Example rules would be:

Stores within a mall are flagged (using known entity detection or subheaders like "Stores—" to be entities by themselves).

Container store resolution. Certain businesses are flagged as "containers" (businesses that can have other businesses located within them); businesses detected within containers are made their own entities. An example would be a wireless store, a bank, or a major tax preparation business existing within a large retailer or a grocery store.

Parent/sibling relational inference. Within a caption, properties of parents or siblings may be used to determine context for other lines in the caption. Examples include:

Subheader inference. Certain subheaders (e.g., "branch offices" or "stores" or "departments") may indicate properties of their descendants, such as that they are all entities or departments.

Sibling generalization. If siblings of an unknown line in a caption set tend to be of a certain tag type, the unknown line can be inferred to be of that tag type. For example, if many siblings are departments —"Radiology," "Allergy," "Physical Therapy,"— an untagged or unknown line (say, "Unknownology") can be inferred to be a department as well based on the siblings.

Figure 9:
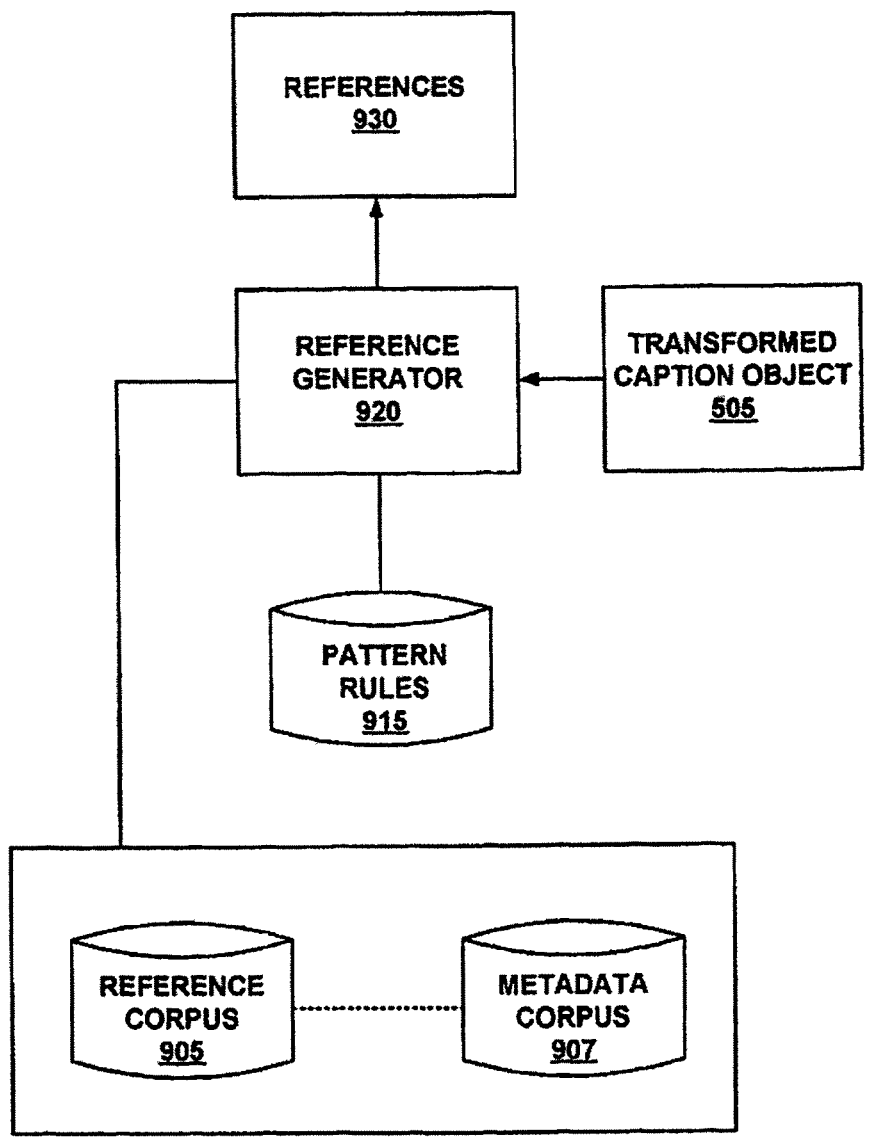
FIG. 9 is a block diagram illustrating generation of reference variances, in accordance with an embodiment of the present invention.

FIG. 9 illustrates the operation of a reference generator according to one embodiment of the present invention. Reference generator 920 utilizes pattern rules to perform pattern matching on metadata tag objects associated with transformed caption object 505. Upon determining a match, reference generator 920 utilizes reference corpus 905 and metadata corpus 907 to generate references. References may be utilized to generate a grammar or be transformed into any other machine recognizable format.

Figure 10A:
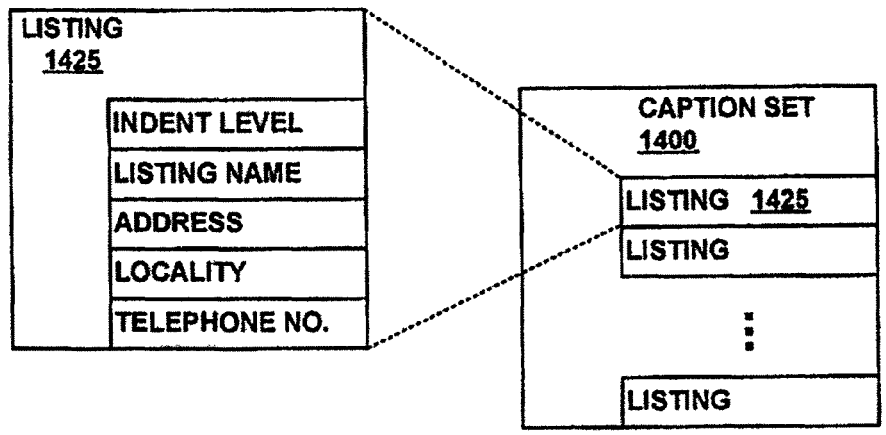
FIG. 10A is a data structure illustrating extracting a listing from raw data, in accordance with an embodiment of the present invention.

FIG. 10A is an exemplary data structure illustrating extracting a caption set 1400 from raw digital telephone directory data, in accordance with an embodiment of the present invention. The caption set object 1400 contains an ordered set of listing objects 1425. The hierarchical nature of the caption set is preserved via an indent level field in the listing objects 1425.

Figure 10B:
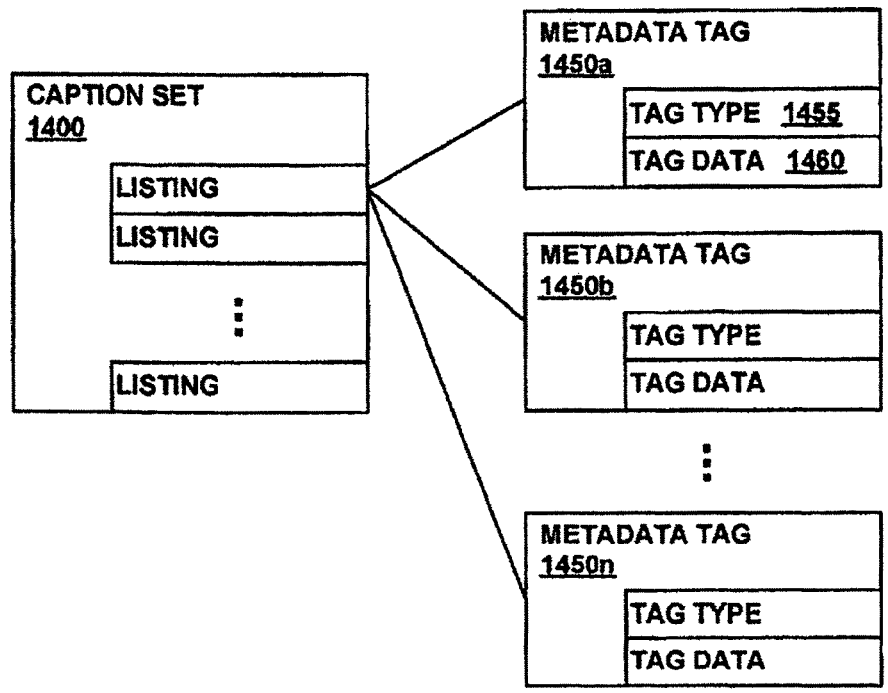
FIG. 10B is a data structure illustrating tagging raw data with metadata, in accordance with an embodiment of the present invention.

FIG. 10B is an exemplary data structure illustrating generation of metadata tags 1450 from a caption set 1400 of raw digital telephone directory data, in accordance with an embodiment of the present invention. A metadata tag 1450 may include a tag type 1455 and tag data 1460. Metadata tags 1450*a*-1450*n* have been created and associated with various listings 1425. A listing 1425 may have more than one metadata tag 1425. In some cases, a listing 1425 may not have an associated metadata tag 1450.

Exemplary metadata tag types 1455 are those for Known Entities (e.g., pre-determined businesses or institutions, such as chains like Walmart or Home Depot, hospitals like Stanford Hospital, or even local businesses); Addresses (e.g., street-type addresses such as "123 Main St.," institution-type addresses like "Acme Shopping Center," airport-type addresses like "SJC International," pseudo-localities like "Cow Hollow" or "Lower Manhattan," etc.); Departments (e.g., "Pharmacy" or "Men's"); Business Types (e.g., "Pizza" or "Flowers"); Locations (e.g., "Seattle"); Subheaders (e.g., "Branch Offices"); Abbreviations (e.g., "St." or "Ins.").

Figure 10C:
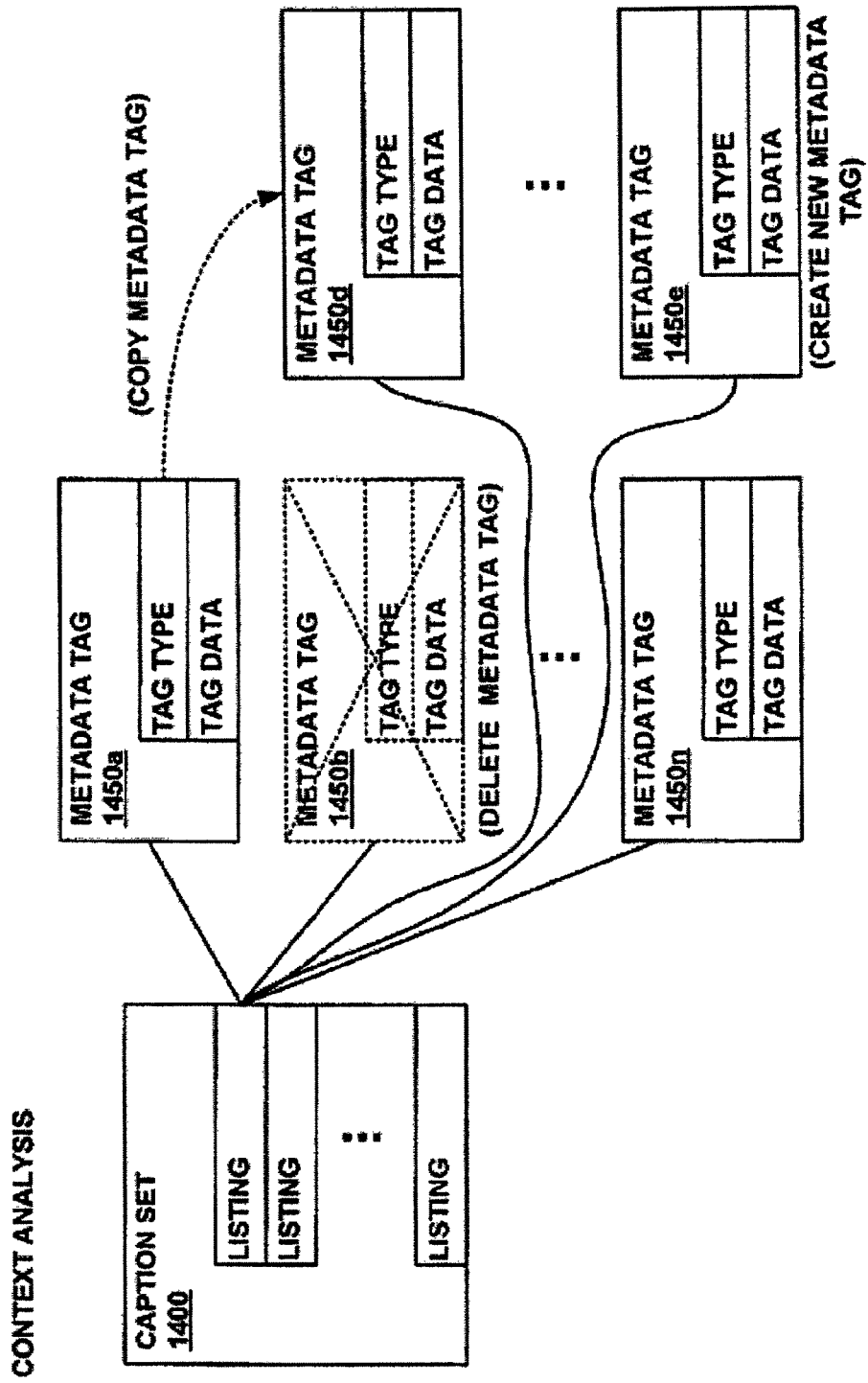
FIG. 10C is a data structure illustrating contextual analysis of metadata, in accordance with an embodiment of the present invention.

FIG. 10C illustrates modification of the metadata tags associated with the listings. The metadata tags in FIG. 10C are referred to herein as transformed metadata. Metadata tags 1450 can be deleted based on contextual analysis, as illustrated by the deletion of metadata tag 1450*b*. New metadata tags can be created based on contextual analysis, as depicted by metadata tag 1450*e*. Metadata tags can be copied from existing metadata tags based on contextual analysis. For example, metadata tag 1450*d* is created by copying metadata tag 1450*a*. However, metadata tags 1450*a* and 1450*d* are associated with different listings in the caption set 1400. Metadata tags 1450 may be retained unchanged as depicted by metadata tags 1450*a* and 1450*c*.

Figure 10D:
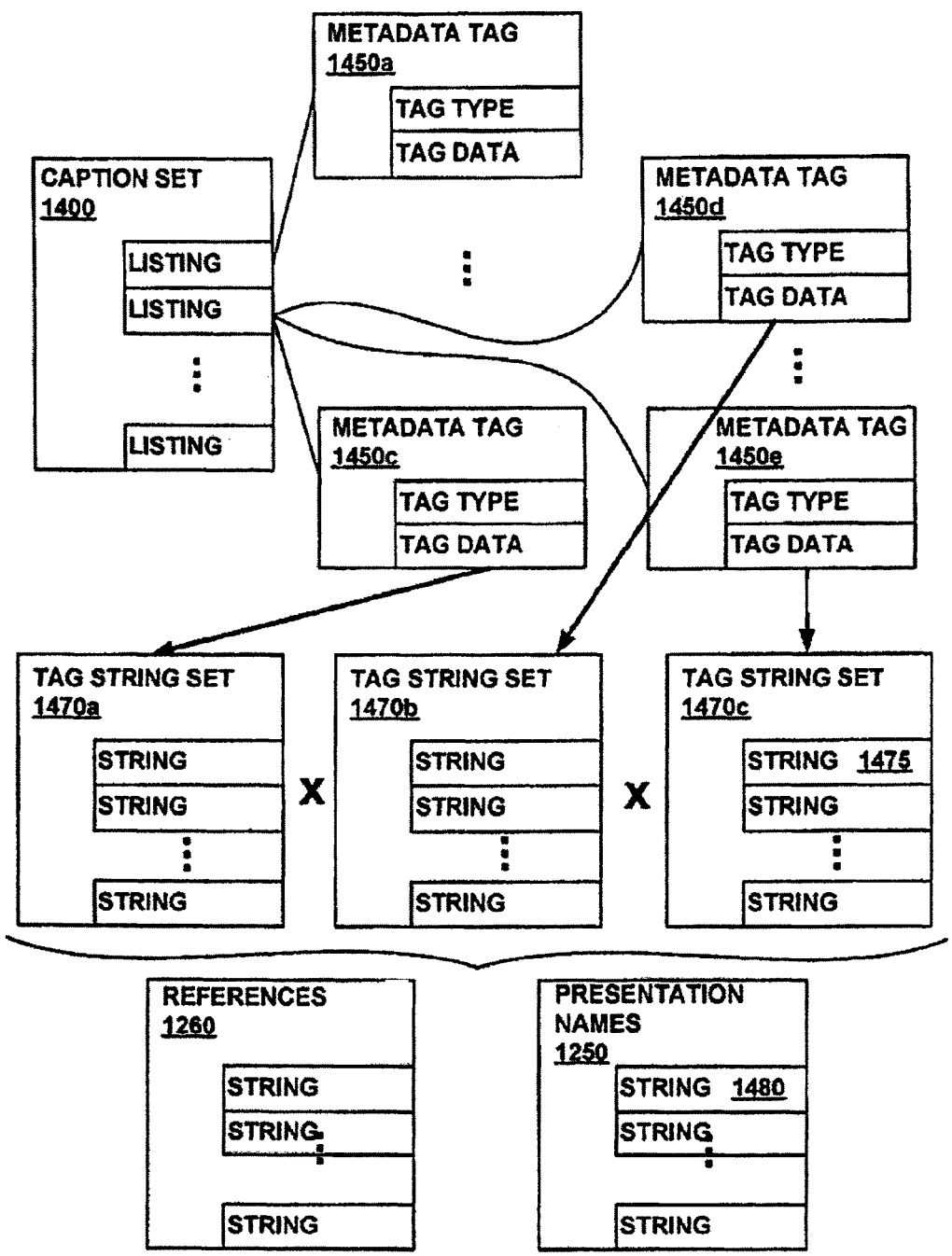
FIG. 10D is a data structure illustrating reference and presentation name generation, in accordance with an embodiment of the present invention.

FIG. 10D is a data structure illustrating generating reference variations and presentation names, in accordance with an embodiment of the present invention. Tag string sets 1470 are generated based on the transformed metadata information. For example, in FIG. 10D, tag string 1470*a* is generated based on metadata tag 1450*c*, which was created from the caption set (e.g., raw digital telephone directory information). Tag string sets 1470*b* and 1470*c* were created based on metadata tags 1450*d* and 1450*e*, respectively, which were created based on contextual analysis of metadata information. Reference variations 1260 and presentation names 1250 are created from the tag string sets 1470.

Figure 10E:
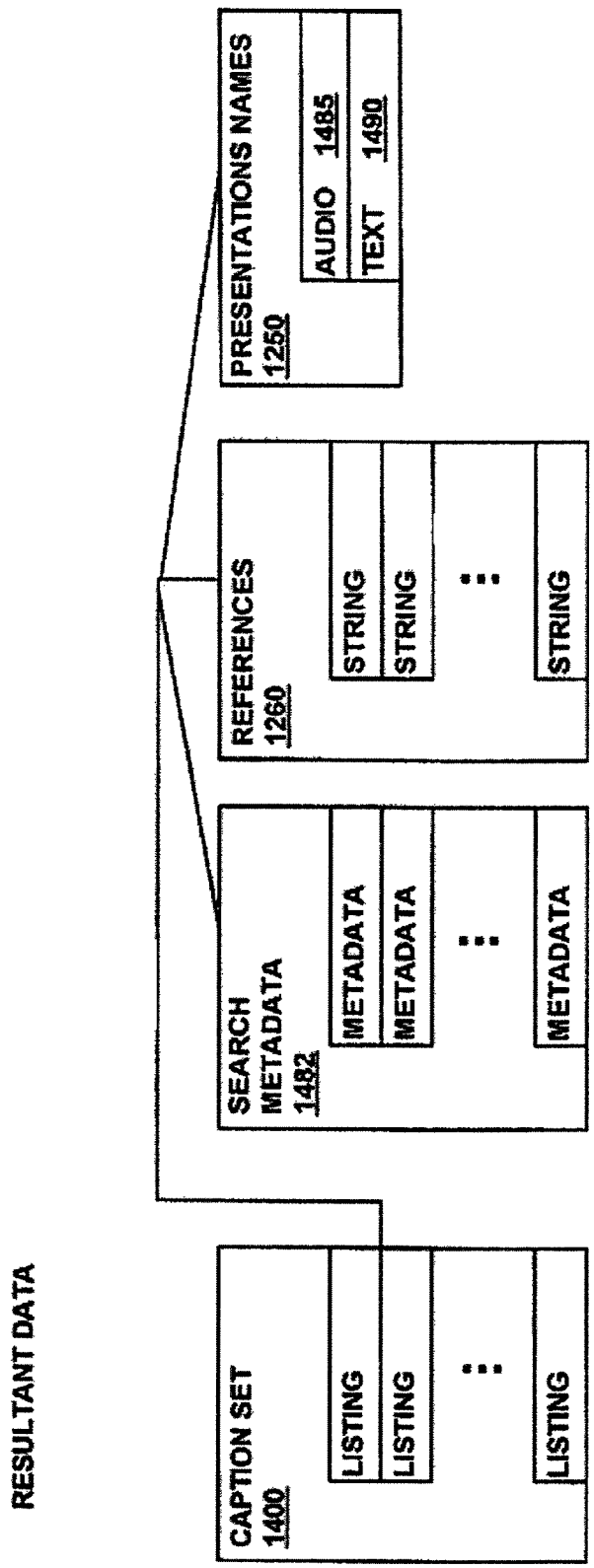
FIG. 10E is a data structure illustrating generated reference variations and presentation names, in accordance with an embodiment of the present invention.

FIG. 10E illustrates exemplary data structures generated in accordance with embodiments of the present invention that may be used for directory search systems or speech grammar generation. The exemplary data structures include search metadata, which may be used to search a raw information database. Also included are the previously discussed reference variations 1260 and presentation names 1250.

Figure 11A:
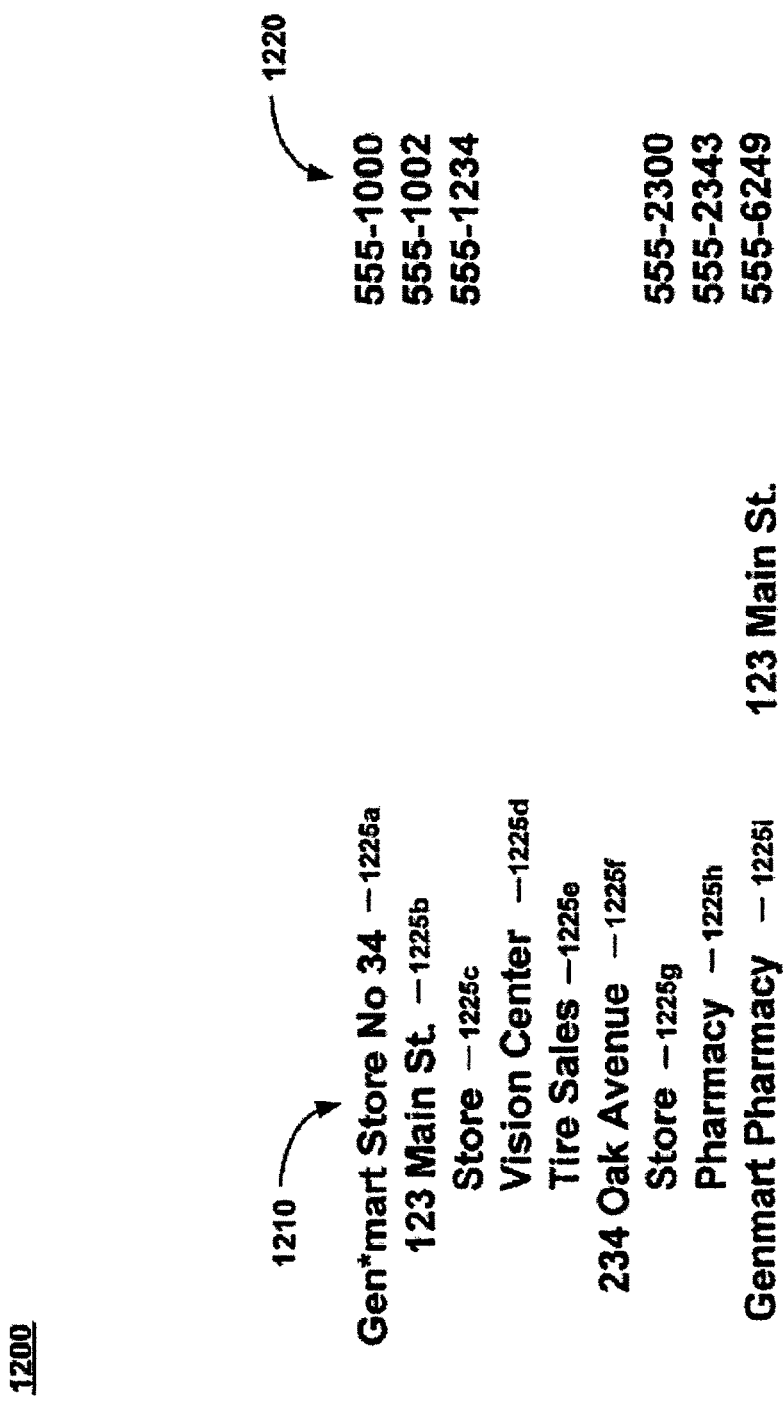
Figure 11E:
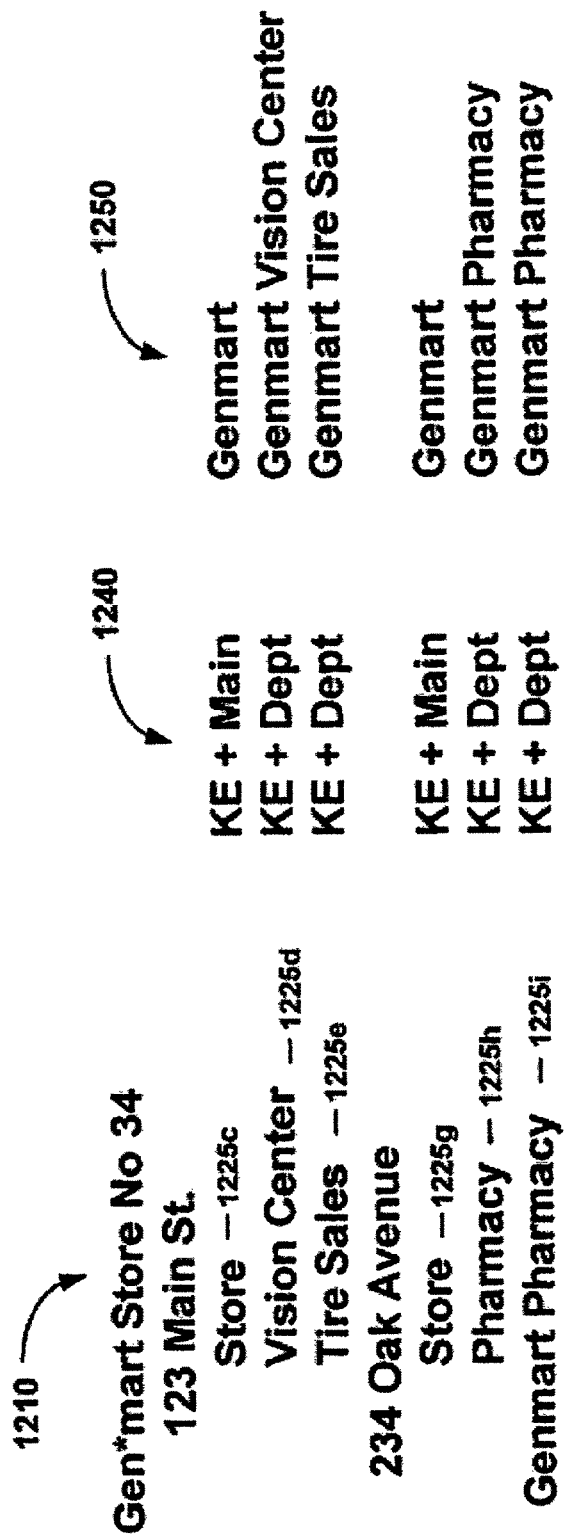
Figure 11F:
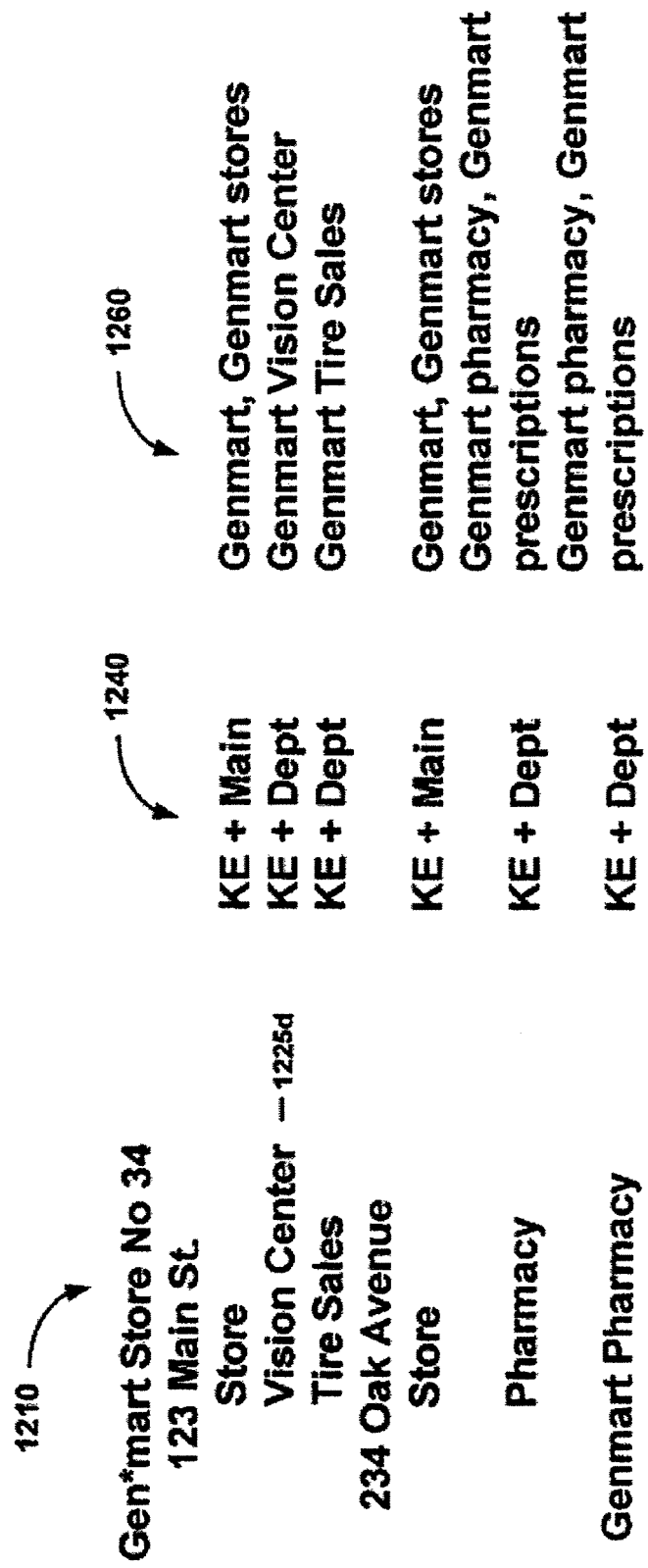
Figure 12:
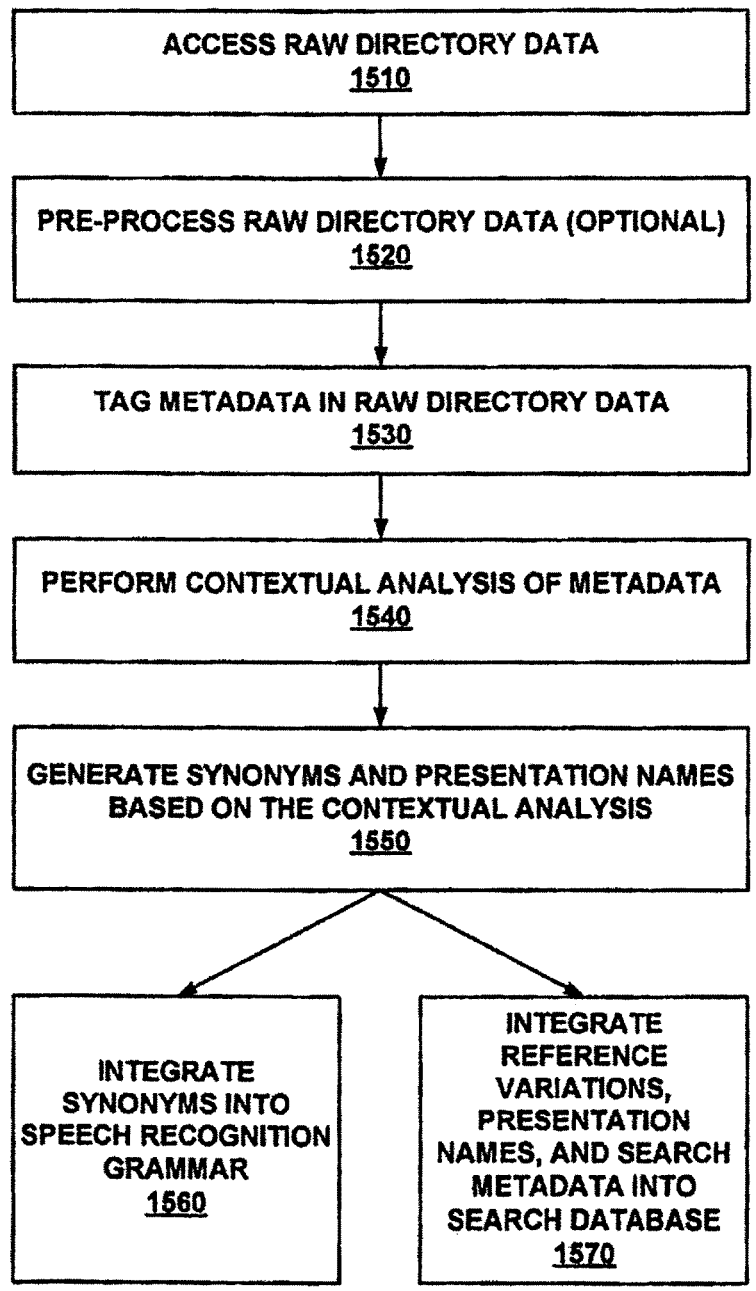
FIG. 12 is a flowchart illustrating steps of a process of automatically generating input parameters to speech recognition processes, in accordance with an embodiment of the present invention.

FIG. 12 is a flowchart illustrating steps of a process of automatically generating input parameters to speech recognition processes and a search database, in accordance with an embodiment of the present invention. FIG. 12 will be discussed in conjunction with FIGS. 11A-11F, which provide an example of automatically generating speech recognition process input parameters from raw telephone directory data, in accordance with an embodiment of the present invention. It will be understood that process 1500 of FIG. 12 is not limited to the example provided in FIGS. 11A-11F.

In step 1510 of FIG. 12, raw telephone directory data is accessed. FIG. 11A depicts a portion of raw telephone data 1200 including listings 1210 and telephone numbers 1220 associated with the listings 1225*a-i*. The telephone directory data may be a conglomerate of local and toll-free telephone directory information. For example, some vendors provide an electronic data file comprising information from telephone directories throughout the United States (and possible other countries).

In part because the telephone directory data may be a conglomerate of local and toll-free telephone directory information, the raw telephone directory data is not formatted in such a fashion as for it to be readily consumable by a computer automated directory assistance program. In optional step 1520 of FIG. 12, the raw telephone directory data is pre-processed, if necessary. For example, data normalization may be performed.

In step 1530 of FIG. 12, metadata is created relating to listings in the telephone directory data in order to provide meaning for listings in the metadata. For example, a metadata tag can be associated with a known national retail chain, hospital, airport, etc. The metadata tagging can be accomplished by one or more software modules that parse the listings 1225.

FIG. 12B illustrates tagging of various listings 1225 with metadata tags 1230. In this case a "known entity" metadata tag has been applied to two of the listings 1225*a*, 1225*i*. The "known entity" metadata tag indicates that the listing relates to some entity that the system recognizes, in this case a national chain of department stores. Metadata tags for "address," "main," and "department" are also indicated in FIG. 11B.

A listing may have multiple metadata tags associated with it. For example, the listing 1225*i* has a "known entity" metadata tag and a "department" metadata tag. It is possible that the metadata tagger modules that initially parse the listings do not determine a metadata tag for a given listing. For example, the tire sales listing 1225*e* does not yet have a metadata tag. This may result if none of the metadata tagger modules was able to determine a tag for a listing. In this case, a metadata tag can be derived by contextual analysis, as described in step 1250.

In step 1540 of FIG. 12, contextual analysis is performed based on the metadata tags. The contextual analysis allows semantic relevancy to be derived from the raw telephone directory data.

Step 1540 allows entity-specific handling. For example, hospitals, retail stores, malls, and governments can be handled differently when processing the telephone directory data. Step 1540 allows specific handling based on factors other than entity type.

FIG. 11C illustrates that a metadata tag "dept: tire sales" has been added to the tire sales listing 1225*e* based on a contextual analysis of the metadata. For example, the interrelationship between elements (e.g., listings) of the metadata is analyzed. In this case, the "tire sales" listing 1225*e* is likely to be a department based on its proximity in the tire sales listing to the vision center listing 1225*d* and other listings.

In one embodiment, the contextual analysis of step 1540 includes applying telephone operator frequency data to select an item in the telephone directory data. The telephone operator frequency data is data that may describe the frequency with which a telephone operator gives out each telephone number. Thus, in this case, the contextual analysis involves selecting which of several listings is more likely than others to be the listing sought by a caller.

The performing contextual analysis of step 1540 of FIG. 12 may comprise determining relevant tags per releasable listing. For example, only a subset of the raw directory information has a telephone number directly associated with it, thus having an applicable releasable listing. FIG. 11D illustrates using context to determine relevant tags per releasable listing. Given the context, relevant tags of "known entity" are copied form listing 1225*a* for the two listings 1225*c* and 1225*g* for the main stores. Further, the relevant tags of "department" are not suppressed for several of the listings (1225*d*, 1225*e*, 1225*h*, 1225*i*).

Step 1550 is generation of reference variations and presentation names. It will be understood that either the reference variations or the presentation names can be generated first, or the generation may be mixed. The presentation names may be presented to a caller via either audio or textual means. FIG. 11E illustrates exemplary presentation names 1250 associated with releasable listings 1225c-e and 1225g-i.

The reference variations are what a caller might say when calling for telephone directory assistance, in this embodiment. FIG. 11F illustrates automatically generating reference variations 1260 of what a caller might say when requesting a telephone number associated with a given listing. For example, when requesting the telephone number for Gen-Mart vision center 1225d, a caller might request one of the reference variations 1260 or something close to a reference variation 1260. It will be understood that the examples in FIG. 11F are a sparse list. Table I provides some exemplary synonym phrases for Gen-Mart vision center, although the examples are not limiting.

TABLE I

Gen-Mart Vision
Gen-Mart Vision Center
Gen-Mart Vision Department
Gen-Mart Glasses
Gen-Mart Glasses Department
Gen-Mart Eye Glasses
Gen-Mart Eye Glasses Department
Gen-Mart Stores Vision
Gen-Mart Stores Vision Center
Gen-Mart Stores Vision Department
Gen-Mart Stores Glasses
Gen-Mart Stores Glasses Department
Gen-Mart Stores Eye Glasses
Gen-Mart Stores Eye Glasses Department
Vision Center at Gen-Mart
Vision Department at Gen-Mart Step 1560 of FIG. 12 is integrating the reference variations into speech recognition grammars. This allows for improved speech recognition and a more economical solution than conventional techniques. Step 1570 of FIG. 12 is integrating the reference variations into speech recognition grammars.

Figure 13A:
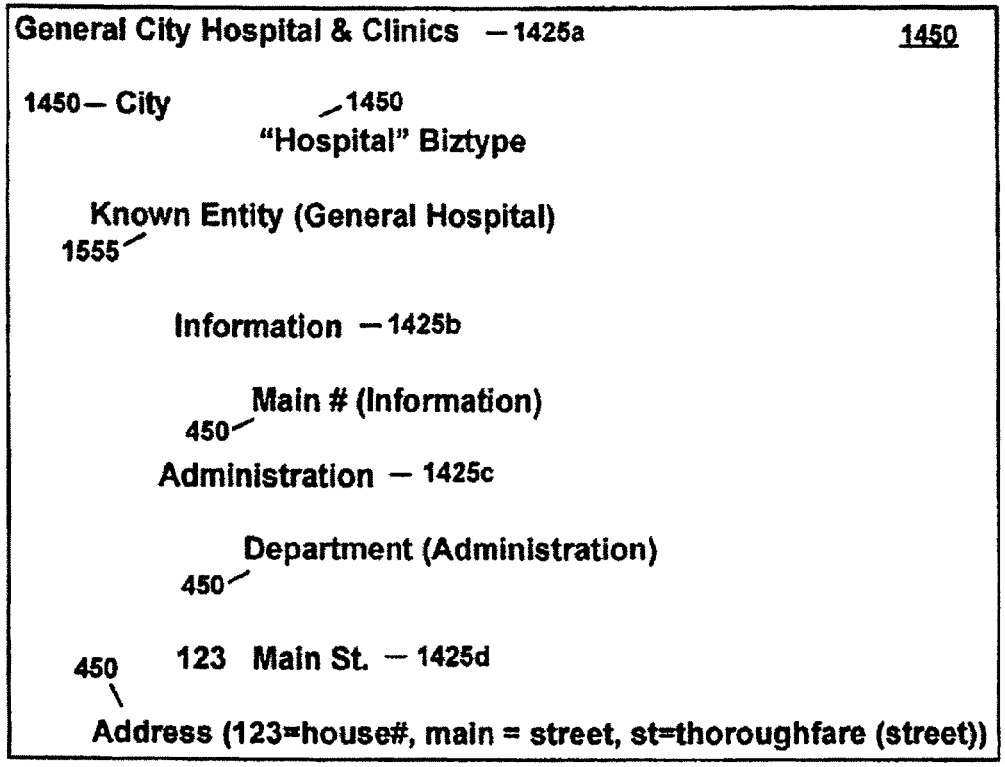
FIGS. 13A-13B are diagrams illustrating automatically generating synonyms from telephone directory data, in accordance with an embodiment of the present invention.
Figure 13B:
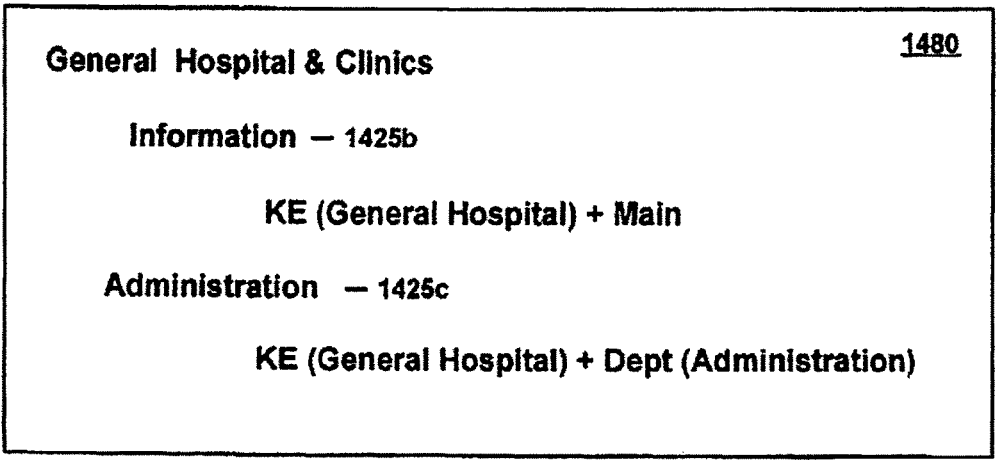

FIGS. 13A-13B illustrate an example of automatically generating reference variations that may be used in speech recognition processes, in accordance with an embodiment of the present invention. Initially, a caption set 1400 is extracted out of the raw telephone data. For example, the caption set 1400 is extracted from a larger body of digital telephone directory data (not depicted in FIG. 13A).

Then the system parses each line and develops metadata tags for the listings 1425a-d, as illustrated in the information with metadata tags 1450 in FIG. 13A. For example, the entire first listing 1425a is tagged with metadata indicating a known entity of "General City Hospital and Clinics." Further, within the first listing 1425a, "General City" is tagged with metadata indicating a "city" and "Hospital" is tagged as the business type "Hospital."

The next listing 1425b "information" is tagged with metadata indicating a main number relating to information. The following listing 1425c "administration" is tagged with metadata indicating a department relating to administration. The last listing 1425d is tagged with metadata indicating an address with fields indicated in FIG. 13B. Further details of address tagging are described herein.

After the listings 1425a-d have been tagged with metadata, a contextual analysis is performed, as illustrated in the contextually analyzed information 1480 in FIG. 13B. In this case, the context concerns a hospital. Therefore, a set of rules that are adapted to processing hospital telephone directory data are applied. For example, the set of rules may prescribe that main numbers and departments are to be searched for, while ignoring addresses.

Referring now to FIG. 13B, note that the address listing (FIG. 13A, 1425d) is not presented in the contextually analyzed information 1480. The information listing 1425b has associated therewith the metadata tags "known entity" and "main." The known entity metadata tag has an identifier of "General Hospital." The administration listing 1425c has associated therewith the metadata tags "known entity" and "department." The known entity metadata tag has an identifier of "General Hospital" and the department metadata tag has associated therewith the identifier of "administration."

Reference variations are then formed from the metadata tags in FIG. 13B (reference variation generation not depicted in FIG. 13B). For example, referring to the metadata for the administration listing 1425c, the reference variations of "General Hospital Administration," "General Hospital Administration Office," and "Administration Office of General Hospital" may be generated. Other reference variations may be generated, as well.

Reference variations may also be generated for the information of listing 1425b. However, it is not required that reference variations be generated for all listings. For example, reference variations might not be generated for the address listing 1425d. If desired, presentation names and search metadata may also be generated based on the metadata.

Address Tagger

An embodiment of the present invention is an address tagger that may be used to tag listings in a file of digital telephone directory data. The addresses in a telephone directory data are not necessarily normalized in an address field. This embodiment detects addresses in telephone directory data and creates metadata tags to indicate a detected address.

This embodiment of the present invention parses addresses within directory assistance listings data into fields suitable for doing address disambiguation, performing concatenated audio, and generating input parameters to speech recognition processes. Address disambiguation may include address playback, grammar generation for street recognition, and house number disambiguation. Sometimes the raw telephone directory data provides addresses only in the listing name field. This embodiment of the present invention detects such addresses (with special cases to prevent over-generalization), and normalizes them.

The present embodiment comprises address parsing, address detection, and address normalization. Address parsing may be based on the following exemplary elements: streets, thoroughfares, route numbers, intersections, house numbers (with letters, with fractions, or spelled out (e.g., "One Microsoft Way")), institutions, and pre- and post-directionals.

Table II provides an example for a single "straight line listing." Table II indicates a listing name and address, along with the associated result. The address parser splits the listing into fields that identify relevant parts of an address. For example, there are fields for "house number," "street," and "thoroughfare."

TABLE II

| Listing Name | Listing Address | Result |
| --- | --- | --- |
| Tellme Networks Incorporated | 1310 Villa Street | House number = "1310"<br>Street = "villa"<br>Thoroughfare = "street" |

Table III provides an example for a "caption set listing." Table III indicates a listing name, along with the associated result. Addresses often appear in caption sets as part of the listing name. The present embodiment detects these addresses such that they can be offered to the caller. The present embodiment uses the address parser on caption set listing names to determine if the listing name is really an address. This may be referred to as street disambiguation, which is something that live operators do quite well. By detecting addresses in caption sets, the present embodiment is able to provide the caller with a quality experience possible with a live operator, but more economically.

TABLE III

| Listing Name | Listing Address | Result |
|---|---|---|
| AAA Automobile Club -- Emergency Road Service Toll Free Branch Offices -- | | |
| | 1 Hanover Rd | House number = "1" Street = "Hanover" Thoroughfare = "road" |
| | 24 Echo Plaza Shopping Center | House number = "24" Institution = "echo plaza shopping center" |
| | 711 State Highway No. 10 | House number = "711" Thoroughfare = "state highway number" Route number = "10" |
| | 155 Pompton Ave. | House number - "155" Street = "Pompton" Thoroughfare = "avenue" |

It is not uncommon for telephone directory data to include addresses as intersections of two streets. The present embodiment looks for intersection patterns. Identifying as many addresses as possible allows the present embodiment to offer multiple locations to a caller. Detecting intersections allows automating more listings than if intersections were not detected.

Institutions are prevalent in telephone directory data. For example, in a caption set there may be a number of street addresses (5th Ave., 1234 N. Main St.) as well as shopping centers (Gateway Shopping Ctr.). The present embodiment uses keywords (e.g., known entities) to detect common institutions.

Lexical tagging followed by pattern matching can miss some cases such as "Blvd. of the Allies" or "Ave. of the States." The present embodiment allow for fix-up rules that can change lexical tags before the pattern match process.

Some address structures can cause false hits on the detector (e.g., 10 Penn Center vs. Cancer Center). The present embodiment has various levels of parsing depending on the raw telephone directory data. When the raw telephone directory data is the listing name, some keywords are treated as questionable unless other evidence exists that suggests the string is truly an address. This prevents false hits that would cause non-addresses to be presented as addresses.

An embodiment uses lookup tables of lexical tags to output tags. This allows fast response to possible customer complaints, such that address detection may be easily tuned based on feedback from the customer.

Biztypes

An embodiment of the present invention categorizes some listings into one of a known set of business types, referred to herein as "BizTypes." One use of a biztype is to add additional reference variations. For example, "Amici's" may have a biztype identifier of "restaurant.pizza," which means that listing processing will generate a synonym "Amici's pizza" in addition to just "Amici's."

A second use of a biztype is to resolve ambiguous metadata tags. For example, the abbreviation "ins" may expand to "institute" normally due to word frequency analysis, but expand to "insurance" for listings with an "insurance" biztype.

Biztypes may be assigned from known entity detection (signified by a biztype attribute on a known_entity tag, from feed provider codes (e.g., SIC (Standard Industrial Classification) codes or North American Industry Classification System (NAICS) codes), from textual analysis of listing names (for example, the word "pizzeria" in a listing name), or from context handlers. In all cases, biztypes may be represented by the type attribute of a biztype metadata tag.

In one implementation, biztypes identifiers are hierarchical, composed of one or more words (e.g., case-insensitive strings of alphabetic characters only), where multiple words are separated by dots. In this hierarchy, more-specific components come later. In general, when performing biztype resolution, more specific biztypes are preferred. For example, the biztype "restaurant.chinese" would be preferred over the biztype "restaurant." Biztype hierarchal naming allows expression of abbreviation rules that apply to all restaurants, while not having to re-express them for Chinese restaurants, for example.

Exemplary Computer Platform

Figure 14:
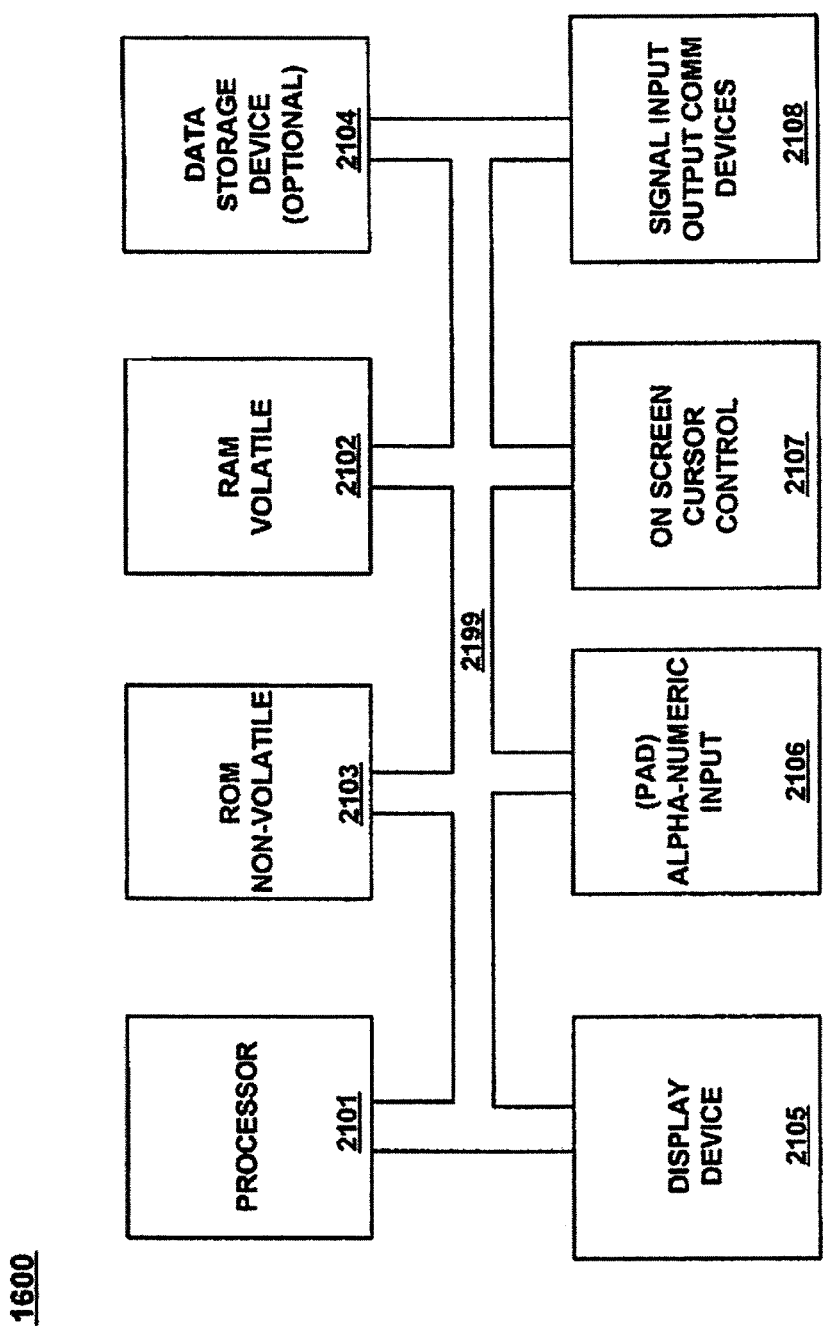
FIG. 14 is an exemplary computer system that may serve as a platform upon which embodiments of the present invention may be executed.

FIG. 14 illustrates circuitry of an exemplary computer system 2100, which may form a platform for embodiments of generation of speech recognition grammar. Computer system 2100 includes an address/data bus 99 for communicating information, a central processor 2101 coupled with the bus for processing information and instructions, a volatile memory 2102 (e.g., random access memory RAM) coupled with the bus 99 for storing information and instructions for the central processor 2101 and a non-volatile memory 2103 (e.g., read only memory ROM) coupled with the bus 99 for storing static information and instructions for the processor 2101. Computer system 2100 also includes an optional data storage device 2104 (e.g., a magnetic or optical disk and disk drive) coupled with the bus 99 for storing information and instructions.

With reference still to FIG. 14, system 2100 also includes an alphanumeric input device 2106 including alphanumeric and function keys coupled to bus 99 for communicating information and command selections to central processor unit 2101. System 2100 also includes a cursor control device 2107 coupled to bus 99 for communicating user input information and command selections to central processor unit 2101. System 2100 of the present embodiment also includes a display device 2105 coupled to bus 99 for displaying information. A signal input/output communication device 2108 coupled to bus 99 provides communication with external devices.

The preferred embodiment of the present invention, automatic generation of reference variations from directory assistance data by performing semantic analysis on the directory assistance data, are thus described. While the present invention has been described in particular embodiments, it should be appreciated that the present invention should not be construed as limited by such embodiments, but rather construed according to the below claims.

We claim:

1. A method of performing input recognition on a listing in a data source using a metadata tag for the listing, the method, comprising:

generating transformed metadata by modifying the metadata tag;

determining the semantic relevancy of the transformed metadata;

applying rules to the transformed metadata to generate modified metadata based on the semantic relevancy;

generating information using the modified metadata for aiding in an automated user input recognition process.

2. The method of claim 1, wherein, the determining the semantic relevancy comprises, resolving tag conflicts.

3. The method of claim 1, wherein, the determining the semantic relevancy comprises, suppressing over-generated tags.

4. The method of claim 1 wherein the automated user input recognition process is a text input recognition process.

5. The method of claim 1 wherein the generating information for aiding in an automated user input recognition process comprises:

based on the transformed metadata, generating a plurality of reference variances associated with the listings; and based on the plurality of reference variances, generating a grammar as the information for aiding in an automated user input recognition process.

6. The method of claim 5 wherein the plurality of reference variances reflect typical variations in human references to the listings.

7. The method of. claim 5 further comprising supplying the grammar to the automated user input recognition process.

8. The method of claim 1 wherein the associating individual listings with metadata information describing the individual listings comprises tagging the individual listings.

9. The method of claim 1 wherein the metadata information describing the individual listings is selected from the group comprising: a known entity; an address; a business name; a main listing; a department; and a person's name.

10. The method of claim 1 wherein the modifying the metadata information comprises identifying groups of listings as pertaining to recognized listing group types.

11. The method of claim 10 wherein the recognized listings group types comprise: a retail group type; a hospital group type; an airline group type; and a government group type.

12. A system for user input recognition comprising:

a metadata generator operable to generate metadata information describing individual listings of a digital directory and to associate the metadata information with the individual listings;

a metadata transformer to determine semantic relevancy of the metadata information and apply rules to the metadata information to generate modified metadata;

logic operable to generate information for aiding in a user input recognition process based on the modified metadata.

13. The system of claim 12, wherein the metadata generator comprises a plurality of tagger modules operable to determine meanings of individual listings of the digital directory and to generate respective tags associated therewith.

14. The system of claim 13, wherein the metadata generator is further operable to tag listings in the digital directory based on metadata context.

15. The system of claim 13, wherein the metadata generator is further operable to determine relevant tags for releasable directory listings in the digital directory based on metadata context.

16. The system of claim 15, further comprising a presentation name generator operable to generate presentation names for the releasable listings.

17. The system of claim 12, wherein the metadata transformer comprises a plurality of context handlers operable to determine meanings of individual listings of the digital directory based on identifying a group listing type within which an individual listing resides.

18. The system of claim 12, wherein the user input is speech and further comprising a grammar generator operable to generate speech recognition grammar based on the information for aiding in a user input recognition process.

19. The system of claim 12, wherein the logic is further operable to generate the information for aiding in a user recognition process based on the metadata information generated by the first metadata generator.

20. The system of claim 12, further comprising a directory search engine that is able to determine a telephone number from the digital directory based on a selected entry of the information for aiding in a user input recognition process.

21. The system of claim 12 wherein the user input is text based input.

22. A computer readable memory having stored thereon instructions that when executed on a processor implement a method of generating input parameters usable in a user input recognition process, the method comprising:

generating transformed metadata by modifying a metadata tag;

determining the semantic relevancy of the transformed metadata;

applying rules to the transformed metadata to generate modified metadata based on the semantic relevancy;

generating the input parameters using the modified metadata for aiding in an automated user input recognition process; and outputting the result to a user as a playback confirmation.

23. The computer readable memory of claim 22, further comprising, performing contextual analysis by applying telephone operator frequency data.

24. The computer readable memory of claim 23, wherein the performing contextual analysis comprises modifying a first metadata based on a first listing of the telephone directory data based on relationship between a second metadata associated with a second listing.

25. The computer readable memory of claim 23, wherein the method further comprises:

recognizing a first synonym phrase of the plurality of synonym phrases in a user input directory request;

determining a telephone number from the telephone directory data based on the first synonym phrase; and supplying the telephone number to the user.

26. The computer readable memory of claim 25, wherein the performing contextual analysis comprises determining relevant tags for releasable telephone listings in the telephone directory data based on contextual analysis of the metadata.

27. The computer readable memory of claim 26, wherein the method further comprises generating presentation names for the releasable telephone listings.

28. The computer readable memory of claim 27, wherein the generating the plurality of synonym phrases further comprises basing at least one of the synonym phrases on the relevant tags for the releasable listings.

* * * * *